(12) United States Patent
Nagata

(10) Patent No.: US 9,139,201 B2
(45) Date of Patent: Sep. 22, 2015

(54) DRIVING ASSIST DEVICE

(75) Inventor: Shinichi Nagata, Yokohama (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/384,566

(22) PCT Filed: Mar. 15, 2012

(86) PCT No.: PCT/JP2012/056741
§ 371 (c)(1),
(2), (4) Date: Oct. 29, 2014

(87) PCT Pub. No.: WO2013/136492
PCT Pub. Date: Sep. 19, 2013

(65) Prior Publication Data
US 2015/0046058 A1  Feb. 12, 2015

(51) Int. Cl.
*G06F 7/00* (2006.01)
*B60W 30/09* (2012.01)
*B60T 7/22* (2006.01)
*B60W 30/14* (2006.01)
(Continued)

(52) U.S. Cl.
CPC *B60W 30/09* (2013.01); *B60T 7/22* (2013.01); *B60W 30/143* (2013.01); *B60T 2201/022* (2013.01); *B60W 30/095* (2013.01); *B60W 30/18154* (2013.01); *B60W 2720/10* (2013.01); *B60W 2720/103* (2013.01)

(58) Field of Classification Search
CPC . B60W 30/09; B60W 30/095; B60W 30/143; B60W 30/18154; B60W 2720/10; B60W 2720/103; B60W 2550/10; B60T 7/22; G08G 1/00; G08G 1/0965

USPC ............... 701/2, 93; 340/901, 902; 198/357
See application file for complete search history.

(56) References Cited

U.S. PATENT DOCUMENTS 7,924,146 B2 *  4/2011  Seder et al. ............... 340/435
8,629,784 B2 *  1/2014  Szczerba et al. ........... 340/905
(Continued)

FOREIGN PATENT DOCUMENTS

JP  2006-260217 A  9/2006
JP  2006-347252 A  12/2006
(Continued)

OTHER PUBLICATIONS

International Search Report for PCT/JP2012/056741, mailed Jun. 19, 2012.

*Primary Examiner* — McDieunel Marc
(74) *Attorney, Agent, or Firm* — Kenyon & Kenyon LLP

(57) ABSTRACT

A driving assistance device includes; a speed zone computation unit configured to compute a speed zone of the host vehicle having a possibility that the host vehicle will come into contact with the mobile object when progressing in the progressing direction, based on the mobile object information set by the mobile object information setting unit; a target speed computation unit configured to compute a target speed of the host vehicle based on a speed zone; and a target speed profile creation unit configured to create a target speed profile for decelerating the host vehicle from the current speed to the blind spot entry target speed, based on a blind spot entry target speed which is the target speed of the host vehicle at the time of entering a place forming the blind spot, a current speed of the host vehicle, and a target acceleration for deceleration.

2 Claims, 13 Drawing Sheets

(51) Int. Cl.
   *B60W 30/095* (2012.01)
   *B60W 30/18* (2012.01)

(56) References Cited

U.S. PATENT DOCUMENTS

| | | | |
|---|---|---|---|
| 8,676,466 B2* | 3/2014 | Mudalige | 701/93 |
| 2006/0282218 A1 | 12/2006 | Urai et al. | |
| 2010/0253492 A1* | 10/2010 | Seder et al. | 340/435 |
| 2010/0253594 A1* | 10/2010 | Szczerba et al. | 345/7 |
| 2010/0256835 A1* | 10/2010 | Mudalige | 701/2 |
| 2014/0091989 A1* | 4/2014 | Szczerba et al. | 345/7 |
| 2014/0180568 A1 | 6/2014 | Nagata | |

FOREIGN PATENT DOCUMENTS

| | | |
|---|---|---|
| JP | 2008-171207 A | 7/2008 |
| JP | 009-230455 A | 10/2009 |
| JP | 2009-237776 A | 10/2009 |
| JP | 2009-301400 A | 12/2009 |
| JP | 2011-118570 A | 6/2011 |
| WO | 2013/021491 A1 | 2/2013 |

* cited by examiner

Fig.11
(a)
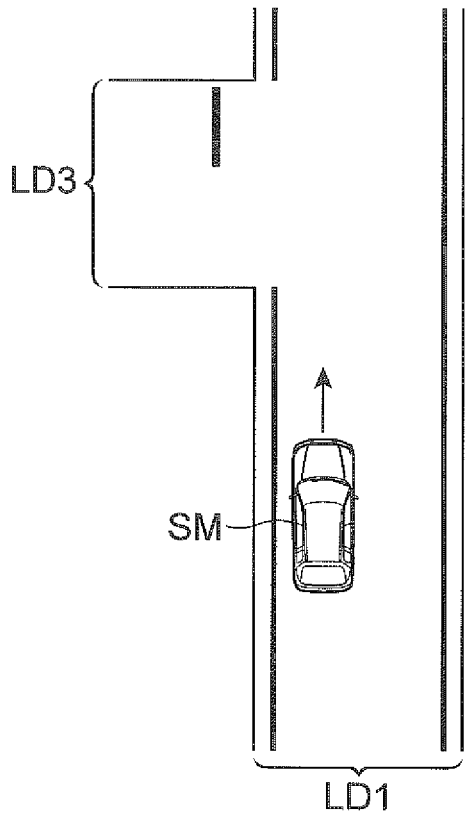
(b)
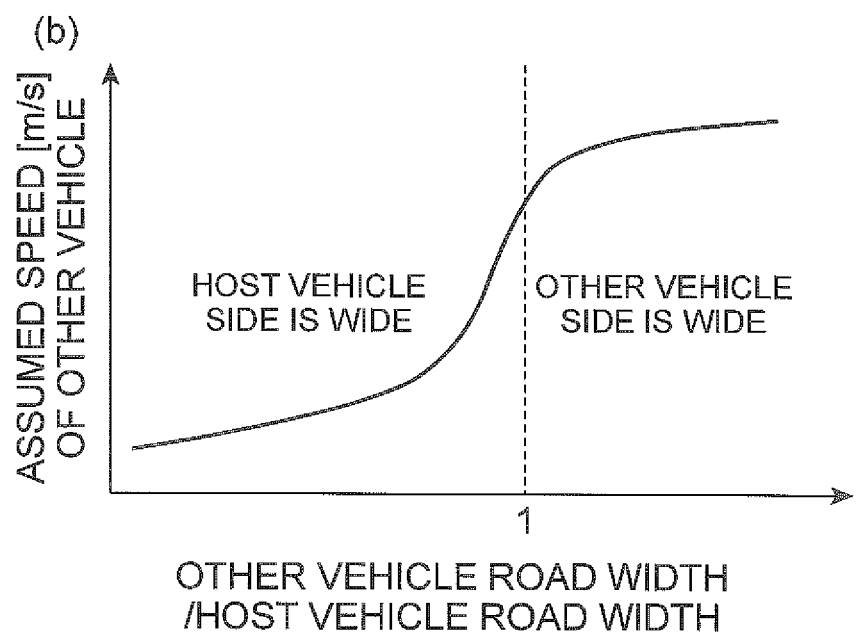

Fig. 12

| COMPUTED DANGER DIRECTION | | DRIVER'S VIEWING DIRECTION | | |
|---|---|---|---|---|
| | | LEFT | FRONT | RIGHT |
| | LEFT | NO ASSISTANCE OR WEAK ASSISTANCE | SLIGHTLY STRONG ASSISTANCE | STRONG ASSISTANCE |
| | BI-DIRECTION | SLIGHTLY STRONG ASSISTANCE | GENERAL ASSISTANCE | SLIGHTLY STRONG ASSISTANCE |
| | RIGHT | STRONG ASSISTANCE | SLIGHTLY STRONG ASSISTANCE | NO ASSISTANCE OR WEAK ASSISTANCE |

DRIVING ASSIST DEVICE

CROSS-REFERENCE TO RELATED APPLICATIONS

This is a national phase application based on the PCT International Patent Application No. PCT/JP2012/056741 filed Mar. 15, 2012, the entire contents of which are incorporated herein by reference.

TECHNICAL FIELD

The present invention relates to a driving assistance device.

BACKGROUND ART

As a driving assistance device of the related art, the device has been known that performs driving assistance in consideration of an object appearing suddenly from a blind spot, when entering an intersection or the like. For example, the driving assistance device described in Patent Literature 1 predicts a course of a host vehicle, recognizes a blind spot of a driver in a progressing direction of the host vehicle, predicts an object having a possibility of appearing suddenly from the blind spot, detects a range in which the object can move, determines that there is a possibility of the collision when the range and a predicted path of the host vehicle overlap each other, and performs the driving assistance so as to avoid the collision.

CITATION LIST

Patent Literature

[Patent Literature 1] Japanese Unexamined Patent Application Publication No. 2006-260217

SUMMARY OF INVENTION

Technical Problem

However, a driving assistance device of the related art performs driving assistance, using a course prediction result of a host vehicle. Thus, the driving assistance device of the related art determines whether or not a collision will occur when travelling according to a predicted course of the present situation, thereby avoiding the collision. But the driving assistance device cannot compute the amount of speed decrease that is required for collision avoidance, the amount of avoidance that is required, or the like. In addition, a collision determination of the driving assistance device of the related art depends on the prediction accuracy of a future position of the host vehicle. Thus, in a case where the prediction accuracy is low (for example, while the host vehicle is accelerated, decelerated, or being steered), there is a possibility that accuracy of the collision determination will be low. In this case, the driving assistance device of the related art performs unnecessary driving assistance, or does not perform the driving assistance at the necessary timing, and thus there is a possibility of giving a sense of discomfort to a driver.

The present invention is made to solve such a problem, and an object of the present invention is to provide a driving assistance device which performs an appropriate driving assistance and can improve safety even more.

Solution to Problem

A driving assistance device includes a blind spot recognition unit configured to recognize a blind spot of a driver in a progressing direction of a host vehicle; a mobile object information setting unit configured to set mobile object information including at least an assumed speed of a mobile object, as information on the mobile object having a possibility of appearing suddenly from the blind spot; a speed zone computation unit configured to compute a speed zone of the host vehicle having a possibility that the host vehicle will come into contact with the mobile object when progressing in the progressing direction, based on the mobile object information set by the mobile object information setting unit; a target speed computation unit configured to compute a target speed of the host vehicle based on a speed zone; and a target speed profile creation unit configured to create a target speed profile for decelerating the host vehicle from the current speed to the blind spot entry target speed, based on a blind spot entry target speed which is the target speed of the host vehicle at the time of entering a place forming the blind spot, a current speed of the host vehicle, and a target acceleration for deceleration.

In the driving assistance device, the mobile object information setting unit predicts the mobile object having a possibility of appearing suddenly from the blind spot, and sets the mobile object information on the mobile object. In addition, the speed zone computation unit can compute the travel speed of the host vehicle having a possibility of the collision with the mobile object, based on the assumed speed of the mobile object predicted to rush out of the blind spot. Subsequently, the speed zone computation unit can compute the speed zone having a possibility that the host vehicle will come into contact with the mobile object, as the speed zone of the host vehicle. The target speed computation unit computes the target speed, based on the computed speed zone. By doing so, the driving assistance device does not compare the assumed mobile object with the course prediction result of the host vehicle, computes the speed zone having a possibility of contacting the mobile object, and computes the target speed based on the computation. In this way, the driving assistance device can perform the control based on the specific target speed which is a speed appropriate to travel, and thus the driving assistance with a high level of safety can be ensured to be performed. In addition, the driving assistance according to the driving assistance device is not influenced by the accuracy of the course prediction of the host vehicle, and thus an appropriate driving assistance can be performed. Furthermore, the driving assistance device includes the target speed profile creation unit which creates the target speed profile for decelerating the host vehicle from the current speed to the blind spot entry target speed at the time of entering the place forming the blind spot. Thus, the driving assistance device can perform finally the driving assistance in which it is considered not only at which speed the host vehicle may enter the place forming the blind spot but also how much the host vehicle may decelerate while reaching there. Accordingly, a more appropriate driving assistance can be performed. As described above, the driving assistance device performs an appropriate driving assistance and can improve the safety even more.

In the driving assistance device, the target speed profile creation unit may be configured to create the target speed profile by computing a contact point of a boundary line of the speed zone and the target speed profile. For example, when the driving assistance is performed according to the target speed profile which avoids too much the speed zone in which there is a possibility that the host vehicle contacts the mobile object, there is a case where the driver feels cumbersome. However, since the target speed profile creation unit creates the target speed profile by computing the contact point of the boundary line of the speed zone and the target speed profile, the safety is ensured in such a manner that the speed of the host vehicle does not enter the speed zone, and it is possible to suppress the cumbersome feeling due to an excessive driving assistance.

In the driving assistance device, the target speed profile creation unit may be configured to create the target speed profile, based on the target acceleration which is constant, a first target position at which a speed of the host vehicle is set as the blind spot entry target speed in front of the blind spot, and a second target position at which deceleration according to the target acceleration is started. Accordingly, the target speed profile creation unit starts the deceleration according to the constant acceleration at the second target position, and in a state where the blind spot entry target speed is set at the first target position in front of the blind spot, can create the target speed profile such as that for entering the blind spot. Accordingly, the driving assistance device can perform the driving assistance in which the speed profile of the driver is realized with a high and safe driving technology.

In the driving assistance device, the target speed profile creation unit may be configured to create the target speed profile using at least one computation method, among a first computation method which computes the first target position and the second target position after the target acceleration is set, a second computation method which computes the target acceleration and the second target position after the first target position is set, and a third computation method which computes the target acceleration and the first target position after the second target position is set. Accordingly, it is possible to create the target speed profile using an appropriate computation method depending on the situation.

In the driving assistance device, the target speed profile creation unit may be configured to study characteristics of the driver, and to determine one computation method, among the first computation method, the second computation method, and the third computation method, based on the characteristics of the driver. Accordingly, it is possible to create the target speed profile using an appropriate computation method depending on the characteristics of the driver, and to perform the driving assistance in which a sense of discomfort to the driver is reduced.

Advantageous Effects of Invention

According to the present invention, it is possible to perform an appropriate driving assistance and to improve safety even more.

BRIEF DESCRIPTION OF DRAWINGS

FIG. 11 is a diagram illustrating an example of factors to be considered when a mobile object information setting unit sets mobile object information.

FIG. 12 is a diagram illustrating an example of a control pattern based on a computed danger direction and a driver's viewing direction.

DESCRIPTION OF EMBODIMENTS

Hereinafter, an embodiment of a driving assistance device will be described with reference to the drawings.

Figure 1:
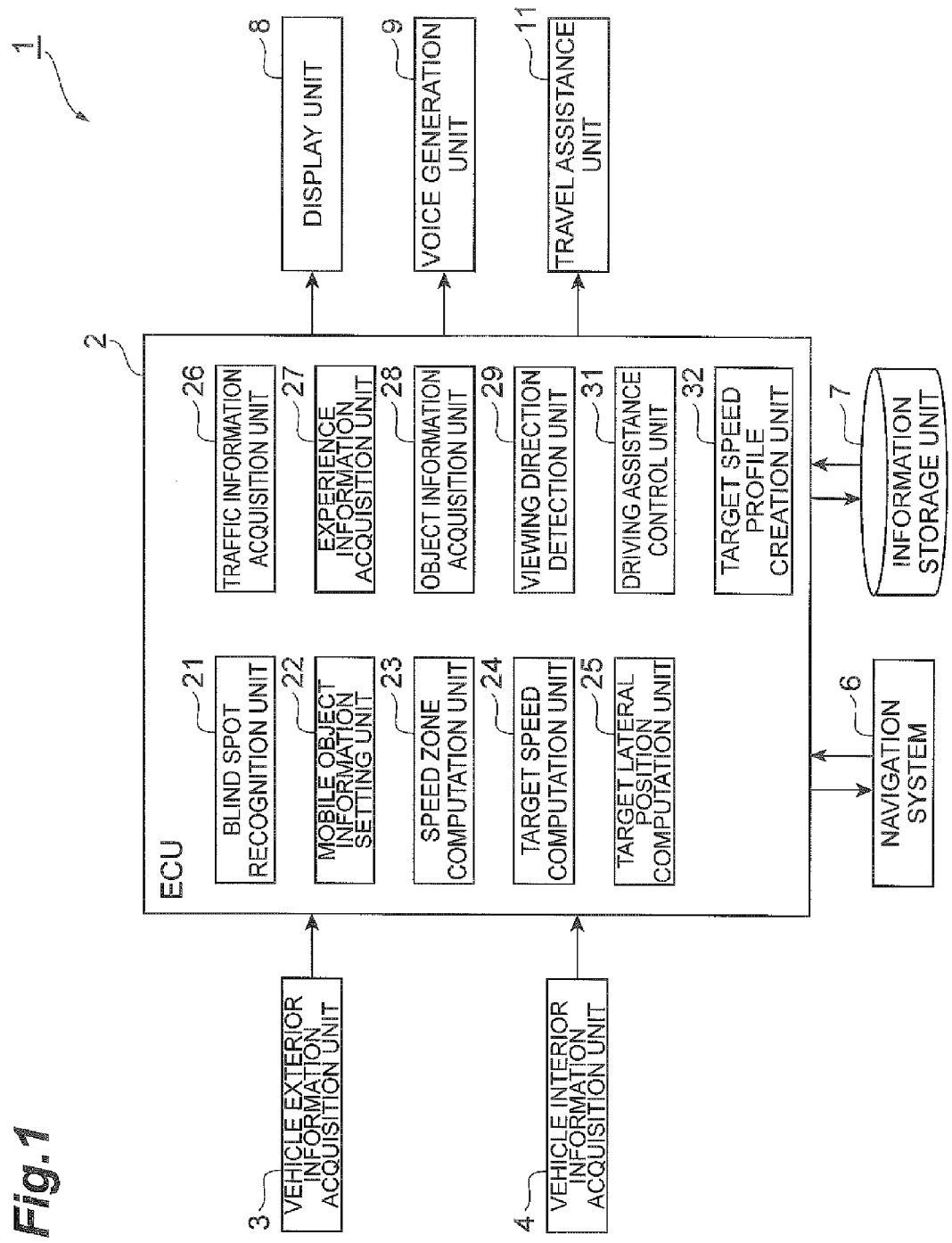
FIG. 1 is a block configuration diagram of a driving assistance device according to an embodiment.
Figure 2:
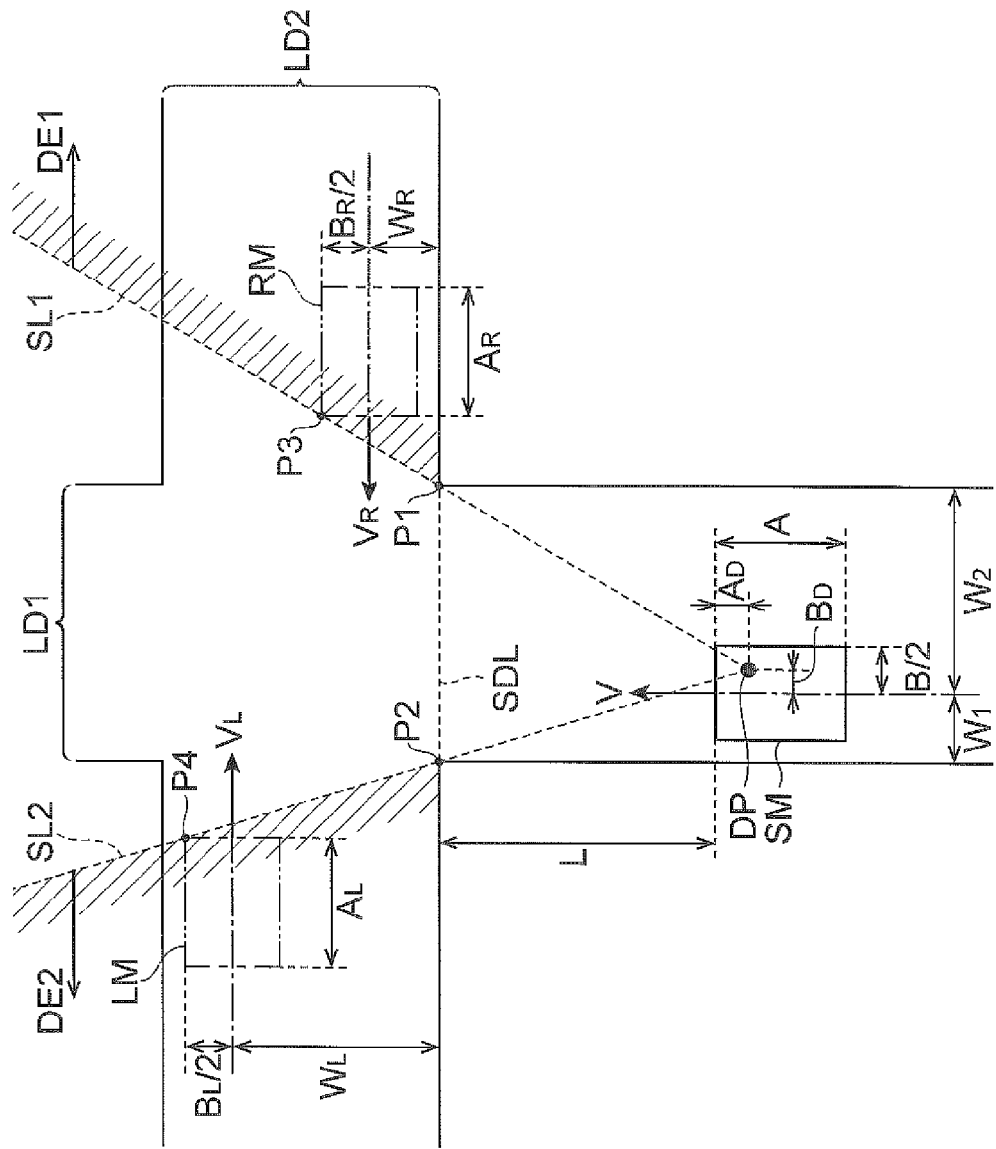
FIG. 2 is a diagram illustrating an example of a state shortly before a host vehicle enters an intersection.

FIG. 1 is a block configuration diagram of the driving assistance device according to the embodiment. FIG. 2 is a diagram illustrating an example of a state shortly before a host vehicle SM enters an intersection. At the intersection illustrated in FIG. 2, a traffic lane on which the host vehicle SM travels is denoted by LD1 and a traffic lane which intersects with the traffic lane LD1 is denoted by LD2. In FIG. 2, it is assumed that the traffic lane LD1 on which the host vehicle SM travels is a priority traffic lane. It is assumed that a structure such as a wall, a fence or a building is provided at least on both sides of the traffic lane LD1. In such an intersection, as illustrated in FIG. 1, a blind spot DE1 is formed on the right side of the host vehicle SM, and a blind spot DE2 is formed on the left side of the host vehicle SM. A view of a driver DP in the host vehicle SM is blocked in a corner P1 on the right side and a corner P2 on the left side. Thus, the blind spot DE1 on the right side is formed in an area on the right side rather than a sight line SL1 passing through the corner P1 on the right side. The blind spot DE2 on the left side is formed in an area on the left side rather than a sight line SL2 passing through the corner P2 on the left side. The driving assistance device 1 performs driving assistance of the host vehicle SM so as to be able to reliably avoid a collision, even though a mobile object rushes out of the blind spots DE1 and DE2. In addition, in the present embodiment, it will be described that other vehicles RM and LM are assumed as the movable bodies which may rush out of the blind spots DE1 and DE2.

As illustrated in FIG. 1, the driving assistance device 1 includes an electronic control unit (ECU) 2, a vehicle exterior information acquisition unit 3, a vehicle interior information acquisition unit 4, a navigation system 6, an information storage unit 7, a display unit 8, a voice generation unit 9, and a travel assistance unit 11.

The vehicle exterior information acquisition unit 3 functions to acquire information on the exterior of the vicinity of the host vehicle SM. Specifically, the vehicle exterior information acquisition unit 3 functions to acquire various information on a structure forming a blind spot around the host vehicle SM, a moving object such as the vehicle, a pedestrian, or a bicycle, a white line or a stop line around the intersection, or the like. For, example, the vehicle exterior information acquisition unit 3 is configured by a camera acquiring an image around the host vehicle SM, a millimeter wave radar, a laser radar, or the like. For example, the vehicle exterior information acquisition unit 3 can detect objects such as the structures on both sides of the traffic lane or the vehicle, by detecting edges that exist around the vehicle using the radar. In addition, for example, the vehicle exterior information acquisition unit 3 can detect the white line around the host vehicle SM, the pedestrian or the bicycle using the image captured by the camera. The vehicle exterior information acquisition unit 3 outputs the acquired vehicle exterior information to the ECU 2.

The vehicle interior information acquisition unit 4 functions to acquire information on the interior of the host vehicle SM. Specifically, the vehicle interior information acquisition unit 4 can detect the position of the driver DP in the host vehicle SM, the direction of the head, the direction of the sight line, or the like. For example, the vehicle interior information acquisition unit 4 is configured by a camera which is provided around the driver's seat and captures the driver DP, or the like. The vehicle interior information acquisition unit 4 outputs the acquired vehicle interior information to the ECU 2.

The navigation system 6 includes various information such as map information, road information or traffic information. The navigation system 6 outputs predetermined information to the ECU 2 at the required timing. The information storage unit 7 functions to store various information, for example, can store past driving information of the driver DP. The information storage unit 7 outputs the predetermined information to the ECU 2 at the required timing.

The display unit 8, the voice generation unit 9, and the travel assistance unit 11 function to assist the driving of the driver DP according to a control signal output from the ECU 2. For example, the display unit 8 is configured by a monitor, a head-up display or the like, and functions to display information for driving assistance. The voice generation unit 9 is configured by a speaker, a buzzer or the like, and functions to generate a voice or a buzzer sound for the driving assistance. The travel assistance unit 11 is configured to have a braking device, a driving device and a steering device, and functions to decelerate to a target speed or functions to move to a target position.

The ECU 2 is an electronic control unit which performs a control of the entire driving assistance device 1, for example, configures a CPU as a main body, and includes a ROM, a RAM, an input signal circuit, an output signal circuit, a power supply circuit or the like. The ECU 2 includes a blind spot recognition unit 21, a mobile object information setting unit 22, a speed zone computation unit 23, a target speed computation unit 24, a target lateral position computation unit 25, a traffic information acquisition unit 26, an experience information acquisition unit 27, an object information acquisition unit 28, a viewing direction detection unit 29, a driving assistance control unit 31, and a target speed profile creation unit 32.

The blind spot recognition unit 21 functions to recognize a blind spot of the driver DP in the progressing direction of the host vehicle SM. The blind spot recognition unit 21 acquires the position of the host vehicle SM, the driver DP, the position of the intersection (and the structure forming the blind spot) of the traffic lanes LD1 and LD2 or the like from the various information acquired by the vehicle exterior information acquisition unit 3 and the vehicle interior information acquisition unit 4, and can recognize the blind spot from a positional relationship to one another. In the example of FIG. 2, since the position of the host vehicle SM in the traffic lane LD1 and the position of the driver DP within the host vehicle SM are already known, the blind spot recognition unit 21 can recognize the blind spots DE1 and DE2 based on a positional relationship between the driver DP and corners P1 and P2.

The mobile object information setting unit 22 functions to set mobile object information on a mobile object which may rush out of the blind spot. For example, the mobile object information includes the information on an assumed speed of the mobile object, an assumed position and an assumed size. In the example of FIG. 2, the mobile object information setting unit 22 predicts that the other vehicle RM may rush out of the blind spot DE1 on the right side and that the other vehicle LM may rush out of the blind spot DE2 on the left side, as the movable bodies. Such other vehicles RM and LM are vehicles that are not actually detected, but are assumed to rush out. The mobile object information setting unit 22 sets the assumed speed, the assumed position and size of such other vehicles RM and LM. A setting method of such mobile object information is not specifically limited, but the detailed example will be described later.

Figure 8:
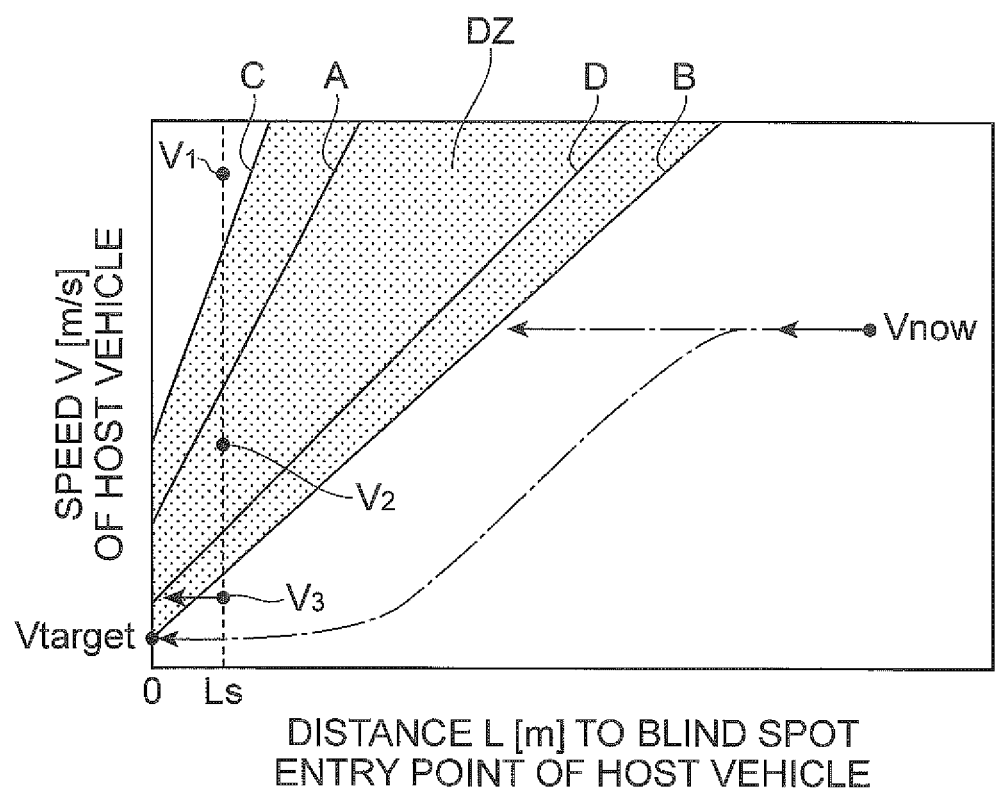
FIG. 8 is a graph illustrating a danger zone.

The speed zone computation unit 23 has a possibility that the host vehicle SM will come into contact with the mobile object when progressing in the progressing direction, and functions to compute the speed zone of the host vehicle SM, based on the mobile object information set by the mobile object information setting unit 22. The speed zone is determined by a relationship between the speed of the host vehicle SM and the distance of the host vehicle SM with respect to a reference position in a place forming the blind spot. Specifically, as illustrated in FIG. 8, the speed zone computation unit 23 computes to obtain a danger zone DZ as the speed zone with a high possibility that the host vehicle SM will collide with the other vehicle which rushes out, with respect to a coordinate in which the vertical axis is denoted by the speed V of the host vehicle SM and the horizontal axis is denoted by the distance L to a blind spot entry point of the host vehicle SM. In other words, the danger zone DZ is determined by a relationship between the speed of the host vehicle SM and the distance of the host vehicle SM with respect to the blind spot entry point. When the driver is driving at a speed and a position (distance to the blind spot entry point) that makes the host vehicle SM enter the danger zone DZ, the host vehicle SM has a high possibility of the collision with the other vehicle at the intersection, when the related other vehicle suddenly rushes out of the blind spot. The computation method of the danger zone DZ will be described later. In addition, the blind spot entry point which becomes "L=0" in a graph of the danger zone DZ is a reference position which is arbitrarily set with respect to the blind spot. In other words, the blind spot entry point is a reference position which is set to the place (intersection) forming the blind spot, so as to specify the distance between the blind spot and the host vehicle SM. Since the reference position is set for the computation, the reference position may be set in any manner with respect to the intersection. The blind spot entry point which is set as the reference position with respect to the present embodiment is a boundary position between a position where a possibility of contacting the host vehicle SM is regarded to occur when the mobile object rushes out of the blind spot, and a position where the mobile object is not regarded to come into contact with the host vehicle SM even when the mobile object rushes out. In the example of FIG. 2, an edge of the host vehicle SM side of the traffic lane LD2, namely, a straight line portion which connects the corner P1 to the corner P2 is set as a blind spot entry point SDL. Such a reference position may be set in any manner, in accordance with a shape of the road in the intersection, an arrangement and a shape of the structure forming the blind spot, or the like.

The target speed computation unit 24 functions to compute a target speed of the host vehicle SM, based on the speed zone computed by the speed zone computation unit 23, namely, the danger zone DZ. The target speed computation unit 24 sets the target speed so as to avoid the danger zone DZ. The target speed computation unit 24 computes the speed at which the host vehicle does not enter the danger zone DZ and sets the computed speed as the target speed, when the host vehicle SM passes through the blind spot entry point SDL. A method of setting the target speed will be described later.

The target lateral position computation unit 25 functions to compute a target lateral position of the host vehicle SM, based on the speed zone computed by the speed zone computation unit 23, namely, the danger zone DZ. The target lateral position computation unit 25 computes a lateral position at which safety can be increased, and sets the computed lateral position as the target lateral position, when the host vehicle SM passes through the blind spot entry point SDL. A method of setting the target lateral position will be described later.

The traffic information acquisition unit 26 functions to acquire information on the road forming the blind spot, namely, the intersection that the host vehicle SM is about to enter. The traffic information acquisition unit 26 can acquire traffic information from the navigation system 6 or the information storage unit 7. For example, the traffic information includes an average traffic volume of the other side road, the number and frequency of past accidents, the number of pedestrians, and the like.

The experience information acquisition unit 27 functions to acquire past experience information of the driver DP. The experience information acquisition unit 27 acquires information from the information storage unit 7. For example, the experience information includes the number of times and frequency that the driver DP has ever passed through a target intersection, the time that has elapsed since the passage, or the like.

The object information acquisition unit 28 functions to acquire object information on behavior of an object present around the host vehicle SM. The object is not particularly limited to things that influence the mobile object in the traffic lane of the other side. For example, a preceding vehicle, an oncoming vehicle, a pedestrian, a motorcycle, a bicycle, or the like can be used as the object. The object information includes the information on a position, a size, a moving direction, a moving speed, or the like of the object described above. The object information acquisition unit 28 can acquire the object information from the vehicle exterior information acquisition unit 3.

The viewing direction detection unit 29 functions to detect a viewing direction of the driver DP. The viewing direction detection unit 29 acquires information from the vehicle interior information acquisition unit 4, and can detect a viewing direction from a sight line or a face orientation of the driver DP.

The driving assistance control unit 31 functions to control a driving assistance by transmitting control signals to the display unit 8, voice generation unit 9, and the travel assistance unit 11 based on various computation results. The driving assistance control unit 31 functions to perform the driving assistance, in such a manner that the host vehicle enters the intersection using the target speed or the target lateral position. The detailed assistance method will be described later. In addition, when the blind spots exist in a plurality of directions, the driving assistance control unit 31 functions to determine a danger direction with a high degree of danger, based on the shape of the speed zone (danger zone DZ) computed by the speed zone computation unit 23. In addition, the driving assistance control unit 31 functions to get the attention of the driver DP using the display unit 8 or the voice generation unit 9, so as to allow the driver DP to turn to the danger direction.

Figure 13:
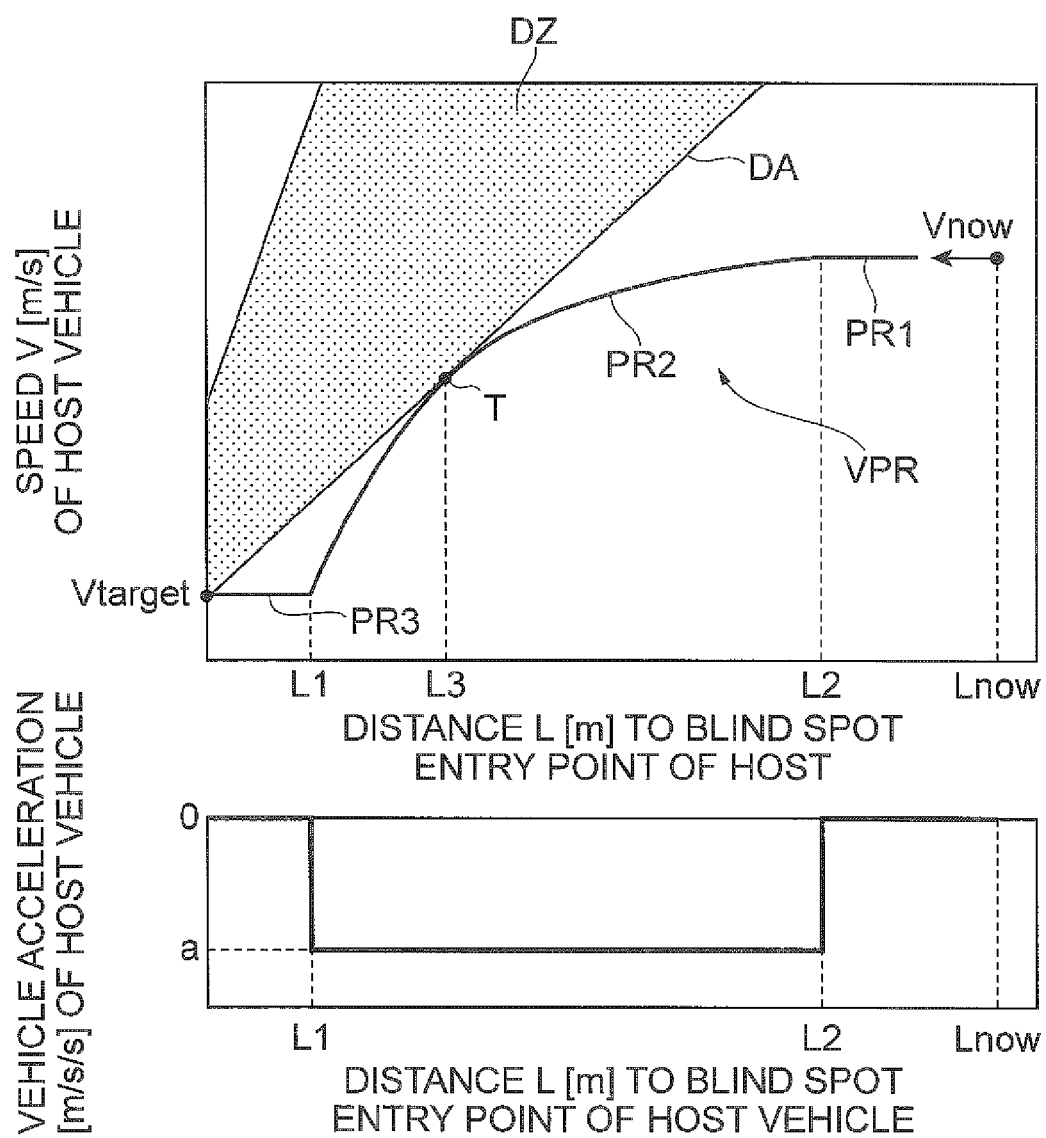
FIG. 13 is a graph illustrating a target speed profile which is created with respect to a danger zone.

The target speed profile creation unit 32 has a function to create a target speed profile VPR with respect to the danger zone DZ. The target speed profile creation unit 32 creates the target speed profile VPR based on a blind spot entry target speed which is the target speed of the host vehicle SM at the time of entering a position (blind spot entry point SDL in the present embodiment) forming the blind spot, a current speed of the host vehicle, and a target acceleration for deceleration. The target speed profile VPR depicts a trajectory of the target speed for decelerating the host vehicle SM from the current speed to the blind spot entry target speed. In an example illustrated in FIG. 13, which is a graph in which a horizontal axis is denoted by a distance to the blind spot entry point SDL of the host vehicle SM and a vertical axis is denoted by the speed of the host vehicle SM, the target speed profile VPR is depicted by a trajectory in which the target speed from the current position ($L=L_{now}$) of the host vehicle SM to the blind spot entry point SDL ($L=0$) is depicted.

The target speed profile creation unit 32 creates the target speed profile VPR by computing a contact point T of a danger zone entry line DA which is a boundary line on an entry side of the danger zone DZ, and the target speed profile VPR. In addition, the target speed profile creation unit 32, in addition to the blind spot entry target speed, the current speed and the target acceleration, creates the target speed profile VPR based on a first target position (position of a distance L1 in the graph of FIG. 13) at which the speed of the host vehicle SM is set as the blind spot entry target speed in front of the blind spot entry point SDL, and a second target position (position of a distance L2 in the graph of FIG. 13) at which decelerating is started using the target acceleration. The target acceleration can be set as a constant acceleration. The target speed profile creation unit 32 may create the target speed profile VPR using all computation methods by using such values. For example, the target speed profile creation unit 32 may create the target speed profile VPR using a first computation method which computes the first target position and the second target position, by setting the target acceleration. In addition, the target speed profile creation unit 32 may create the target speed profile VPR using a second computation method which computes the target acceleration and the second target position, by setting the first target position. In addition, the target speed profile creation unit 32 may create the target speed profile VPR using a third computation method which computes the target acceleration and the first target position, by setting the second target position. The target speed profile creation unit 32 may employ only one computation method of the first to third computation methods, makes it possible to choose from a plurality of computation methods, and may choose any one of them in accordance with the situation. For example, the target speed profile creation unit 32 studies the characteristics of the driver, and may determine any one of the first to third computation methods, based on the characteristics of the driver. Details of a method of creating the target speed profile VPR will be described later.

Figure 3:
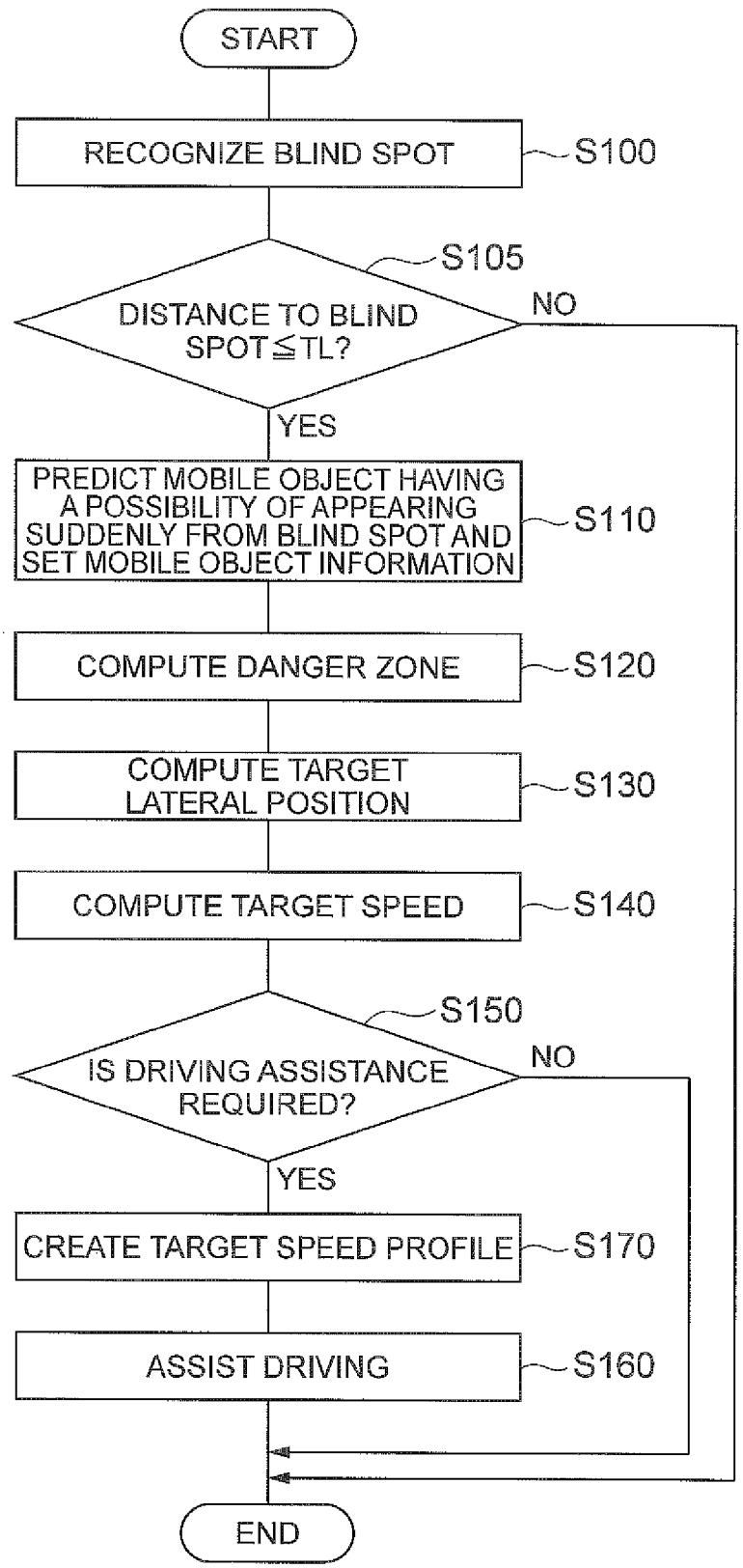
FIG. 3 is a flowchart illustrating a processing content in a driving assistance device.

Next, specific control processing of the driving assistance device 1 will be described with reference to FIGS. 2 to 12. In the present embodiment, processing content in the situation where the host vehicle SM enters the intersection illustrated in FIG. 2 will be described. FIG. 3 is a flowchart illustrating the processing content in the driving assistance device 1. This processing is repeatedly performed at a constant period interval during the driving of the host vehicle.

As illustrated in FIG. 3, the blind spot recognition unit 21 of the ECU 2 recognizes the blind spot, based on the information from the vehicle exterior information acquisition unit 3 or the vehicle interior information acquisition unit 4 (step S100). The blind spot recognition unit 21 grasps the position of the host vehicle SM in the traffic lane LD1 and the position of the driver DP within the host vehicle SM, and grasps the position of the structure forming the blind spot in the progressing direction. The blind spot recognition unit 21 can recognize the blind spots DE1 and DE2, based on a positional relationship between the driver DP and the corners P1 and P2. In addition, in FIG. 2, the size of a vehicle width direction of the host vehicle SM is denoted by B, and the size of a longitudinal direction is denoted by A (the size of the host vehicle SM may be stored in advance). In the lateral position of the host vehicle SM, when a central line is used as a reference standard, a lateral interval on the left within the traffic lane LD1 is denoted by $W_1$ and a lateral interval on the right within the traffic lane LD1 is denoted by $W_2$. In addition, the distance between a front end of the host vehicle SM and the blind spot entry point SDL is denoted by L. The distance of a width direction between the position of the driver DP in the host vehicle SM and the central line of the host vehicle SM is denoted by $B_D$, and the distance of the longitudinal direction between the position of the driver DP in the host vehicle SM and the front end of the host vehicle is denoted by $A_D$. According to the position of the driver DP that is specified, the sight line SL1 which passes through the corner P1 on the right is specified and whereby the blind spot DE1 is specified, and the sight line SL2 which passes through the corner P2 on the left is specified and whereby the blind spot DE2 is specified. In addition, ranges of the blind spots DE1 and DE2 are changed by the position (L, $W_1$, $W_2$) of the host vehicle SM, but the blind spot recognition unit 21 can specify the ranges of the blind spots DE1 and DE2 using an immediate computation from the positional relationship between the driver DP and the corners P1 and P2.

The blind spot recognition unit 21 determines whether or not the distance (or the distance between the current position of the host vehicle SM and the blind spot entry point SDL) between the current position of the host vehicle SM and the blind spots DE1 and DE2 is less than or equal to a predetermined threshold value TL, based on the blind spot DE1 and DE2 recognized in step S100 (step S105). In step S105, if the distance is determined to be greater than the threshold value TL by the blind spot recognition unit 21, the processing illustrated in FIG. 3 is ended, and the processing is repeated again from step S100. The processing when the blind spots cannot be recognized in step S100 is also performed in the same manner as above. On the other hand, if the distance is determined to be less than the threshold value TL by the blind spot recognition unit 21, the processing proceeds to step S110.

The mobile object information setting unit 22 predicts a mobile object having a possibility of appearing suddenly from the blind spots DE1 and DE2, and sets the mobile object information on the mobile object (step S110). In FIG. 2, the mobile object information setting unit 22 predicts that the other vehicle RM has the possibility of appearing suddenly from the blind spot DE1 on the right and that the other vehicle LM has the possibility of appearing suddenly from the blind spot DE2 on the left. The mobile object information setting unit 22 sets the assumed speed, the assumed position, and the assumed size of such other vehicles RM and LM as the mobile object information. Here, the mobile object information setting unit 22 sets the assumed speed $V_R$ of the other vehicle RM, the assumed size $B_R$ of the vehicle width direction of the other vehicle RM, and the assumed size $A_R$ of the longitudinal direction. The mobile object information setting unit 22 sets the assumed lateral position $W_R$ of the other vehicle RM. In addition, such an assumed lateral position is a lateral interval on the left in the progressing direction at the time when the central line of the other vehicle RM is used as the reference standard. The mobile object information setting unit 22 sets the position where the mobile object rushes out of the fastest blind spot DE1 as the assumed position in the progressing direction of the other vehicle RM. In other words, the position where a corner P3 on the right front of the other vehicle RM is on the sight line SL1 is set as the assumed position. The mobile object information setting unit 22 sets the assumed speed $V_L$ of the other vehicle LM, the assumed size $B_L$ of the vehicle width direction of the other vehicle LM, and the assumed size $A_L$ of the longitudinal direction. The mobile object information setting unit 22 sets the assumed lateral position $W_L$ of the other vehicle LM. In addition, such an assumed lateral position is a lateral interval on the left in the progressing direction at the time when the central line of the other vehicle LM is used as the reference standard. The mobile object information setting unit 22 sets the position where the mobile object rushes out of the fastest blind spot DE2 as the assumed position in the progressing direction of the other vehicle LM. In other words, the position where a corner P4 on the left front of the other vehicle LM is on the sight line SL2 is set as the assumed position.

An assumption method of the assumed speed is not particularly limited. For example, in consideration of the traffic lane width of the traffic lane LD2 of the other side, or the like, a legal speed on the road may be set as the assumed speed, an average entry vehicle speed may be set as the assumed speed based on the past statistics, and the same speed as the host vehicle SM may be set as the assumed speed. An assumption method of the assumed position (assumed lateral position) is not particularly limited. For example, a central position of the travel lane may be set as the assumed position, an average entry vehicle position may be set as the assumed position based on the past statistics, and the same position as the host vehicle SM may be set as the assumed position. In addition, an assumption method of the assumed size of the other vehicle is not particularly limited as well. For example, data that is prepared as a general vehicle size in advance may be set as the assumed size, an average size of a general car may be set as the assumed size, and the same size as the host vehicle SM may be set as the assumed size.

In addition, the mobile object information setting unit 22 may set the mobile object information, based on a road shape (namely the intersection shape) forming the blind spots DE1 and DE2. For example, in a T-shaped intersection as illustrated in FIG. 11(a), the other vehicle only turns right or turns left, and thus the speed of the other vehicle is predicted to decelerate considerably compared with a case where the other vehicle heads in a straight line. In addition, in a crossroad, it is necessary to predict where the other vehicle rushes out of the left or the right, but in the T-shaped intersection, only appearing suddenly from one side of a traffic lane LD3 may be predicted. Thus, when the intersection to which the host vehicle enters is a T-shaped intersection, the mobile object information setting unit 22 can change the assumed speed or the assumed position of the other vehicle from the case of the crossroad and set accordingly. The driving assistance device 1 can perform the driving assistance with a higher accuracy by considering the road shape. In addition, the mobile object information setting unit 22 may acquire the information on the road shape by directly detecting with the vehicle exterior information acquisition unit 3, or may acquire the information on the road from the navigation system 6.

In addition, the mobile object information setting unit 22 may set the mobile object information, based on the ratio of the traffic lane width of the other vehicle side and the traffic lane of the host vehicle side. For example, when a priority road of the host vehicle side is a large road and the priority road of the other side is a small road, the vehicle on the other side hesitates to enter the intersection without decelerating. On the other hand, when the road of the host vehicle side is the same size as the road of the other side or the road of the other side is larger than that of the host vehicle side, the vehicle on the other side tends to enter the intersection without decelerating. Thus, the mobile object information setting unit 22 sets the assumed speed of the other vehicle by considering the ratio of the traffic lane width of the other vehicle side and the traffic lane width of the host vehicle side, based on the map as illustrated in FIG. 11(*b*). By considering the ratio of each traffic lane in this way, the driving assistance device 1 can perform the driving assistance which is more appropriate the driver's sense and an actual rushing-out speed of the mobile object.

In addition, the mobile object information setting unit 22 may set the mobile object information, based on the surrounding environment of the blind spots DE1 and DE2. In other words, the mobile object information setting unit 12 sets not only the shape of the intersection but also movement information of the other vehicle, based on the surrounding environment of the blind spots DE1 and DE2. For example, when there is a curve mirror at the intersection, it can be determined that the speed of the other vehicle is decreased. In addition, when the stop line in the traffic lane of the other vehicle on the other side is close to the intersection and the stop line is seen from the host vehicle, it can be determined that a deceleration point of the other vehicle is delayed. In this case, it can be determined that the deceleration is not performed if the other vehicle is not close to the intersection and eventually the intersection entry speed is increased. On the other hand, when the stop line in the traffic lane of the other vehicle on the other side is far from the intersection and the stop line is at a position not seen from the host vehicle, it can be determined that a deceleration point of the other vehicle is quick. In this case, it can be determined that the other vehicle performs the deceleration at an early stage and thus eventually the intersection entry speed is decreased. In addition, for example, when a white line such as a side strip extends on both sides of the traffic lane LD1 of the host vehicle side which is a priority traffic lane and the white line extends to even part of the traffic lane LD2 of the other side without interruption, the other vehicle on the other side tends to decelerate. As described above, the mobile object information setting unit 22 may set the mobile object information, based on the surrounding environment which is likely to influence the behavior of the other vehicle. In this way, by considering the surrounding environment of the blind spot, the driving assistance device 1 can perform the driving assistance which is more appropriate for the driver's sense.

In addition, the mobile object information setting unit 22 may set the mobile object information, based on the traffic information acquired by the traffic information acquisition unit 26. For example, since special attention is required at the intersection in which the average traffic volume of the other side road, the number and frequency of the past accidents or the like is high, there occurs necessity for strictly setting the mobile object information. In addition, at the intersection in which the number of pedestrians or the like is high, the speed of the other vehicle on the other side tends to be delayed. The mobile object information setting unit 22 may set the mobile object information by considering the influence of the traffic information as described above. By considering the traffic information which cannot be known only by the information around the blind spot, the driving assistance device 1 can perform valid driving assistance capable of reliably ensuring safety, when the host vehicle passes through a blind spot road with a really high degree of danger.

The mobile object information setting unit 22 may set the mobile object information, based on the experience information acquired by the experience information acquisition unit 27. For example, when the number of times and frequency that the driver DP has ever passed through the target intersection are low, the mobile object information is strictly set in order to give the driver DP attention. In addition, when a long period of time has elapsed after the host vehicle passed through the intersection, the mobile object information is strictly set. The mobile object information setting unit 22 may set the mobile object information in consideration of the influence of the above-described experience information. By using the past experience information of the driver in this way, the driving assistance device 1 can perform the driving assistance which is appropriate to the driver's experience.

In addition, the mobile object information may be set based on the object information acquired by the object information acquisition unit 28. For example, when the object such as a preceding vehicle, an oncoming vehicle, a pedestrian, a motorcycle, or a bicycle enters (or entry can be predicted) the blind spot entry point a predetermined time earlier than the host vehicle SM, the other vehicle of the other side decelerates. The mobile object information setting unit 22 may set the mobile object information in consideration of the behavior of a surrounding object. The behavior of the surrounding object of the host vehicle even influences speed or the like of the mobile object which rushes out. However, the driving assistance device 1 can perform more definite and more appropriate driving assistance, by considering such information.

Next, the speed zone computation unit 23 computes the danger zone based on the mobile object information set in step S110 (step S120). Even though the mobile object rushes out of the blind spot, the speed zone computation unit 23 computes the danger zone by computing the condition that the host vehicle can pass through the intersection without the collision with the mobile object. Specifically, the speed zone computation unit 23 computes "condition A: the condition that the host vehicle SM can pass earlier than the other vehicle RM appearing suddenly from the blind spot DE1 on the right", "condition B: the condition that the other vehicle RM can pass earlier than the other vehicle RM appearing suddenly from the blind spot DE1 on the right", "condition C: the condition that the host vehicle SM can pass earlier than the other vehicle LM appearing suddenly from the blind spot DE2 on the left", and "condition D: the condition that the other vehicle LM can pass earlier than the other vehicle LM appearing suddenly from the blind spot DE2 on the left". Here, the speed V of the host vehicle SM which is a vertical axis of the coordinate in FIG. 8, and the distance L of the host vehicle SM to the blind spot entry point which is the horizontal axis of the coordinate of FIG. 8 are variables. In the below description, the host vehicle SM travels straight at a constant speed V, the other vehicle RM travels straight at a constant assumed speed $V_R$, and the speed and the lateral position are not changed on the way. In addition, in the below description, "front", "rear", "right", and "left" based on the progressing direction of each vehicle.

<Condition A>

Figure 4:
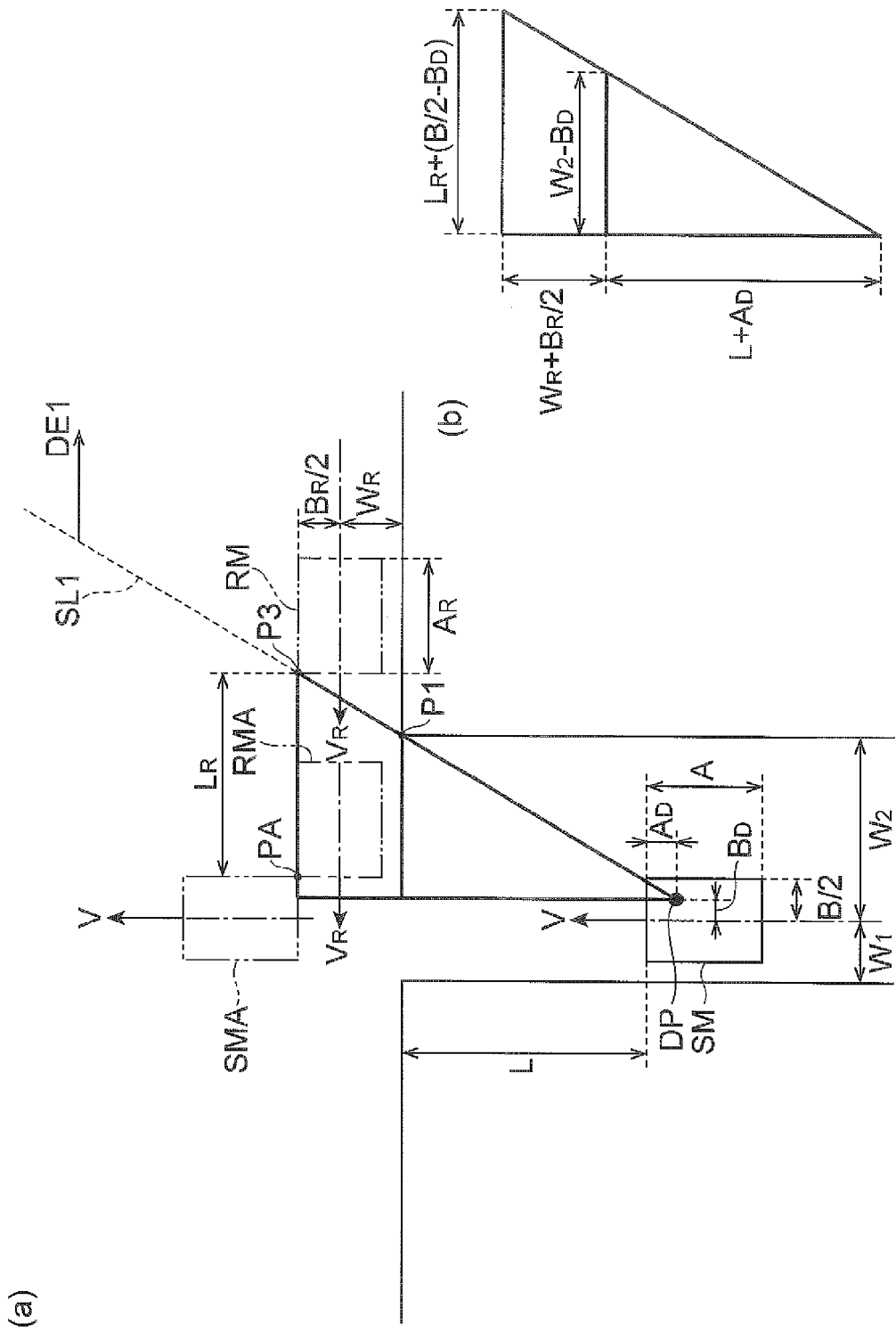
FIG. 4 is a model diagram by which a speed zone computation unit computes a condition A.

FIG. 4 is a model diagram for computing the condition A. In FIG. 4(*a*), a point PA is illustrated in which a right front corner of the other vehicle RM and the right rear corner of the host vehicle SM overlap each other. At this time, the position of the host vehicle SM is illustrated as SMA, the position of the other vehicle RM is illustrated as RMA. In FIG. 4(*a*), the distance that the host vehicle SM moves to the position SMA is $(L+W_R+B_R/2+A)$. On the other hand, the distance that the other vehicle RM moves to the position RMA is illustrated as $L_R$.

Here, the distance $L_R$ is an unknown quantity, but a right-angled triangle drawn from a positional relationship between the driver DP and the corner P1 and a right-angled triangle drawn from a positional relationship between the driver DP and the corner P3 are in a relationship similar to each other. Thus, the relationship of a formula (1A) is established from the dimensional relationship illustrated in FIG. 4(b). A formula (2A) is solved by developing the formula (1A), and thereby the distance $L_R$ is represented by a formula (3A). If the time when the other vehicle RM reaches the position RMA is referred to as $t_{R\_}A$, the time $t_{R\_}A$ is illustrated as a formula (4A) using the distance $L_R$. Here, under the condition A, when the other vehicle RM reaches the position RMA (when the time $t_{R\_}A$ elapsed), a moving distance of the host vehicle SM may be more than or equal to the moving distance to the position SMA. In other words, the speed V of the host vehicle SM may be more than or equal to the speed that the host vehicle SM reaches the position SMA after the time $t_{R\_}A$ has elapsed. As described above, when the speed V that satisfies the condition A is referred to as $V_A$, the speed $V_A$ is represented by a formula (5A).

$$L_R+(B/2-B_D):W_2-B_D=L+A_D+W_R+B_R/2:L+A_D \quad (1A)$$

$$(L_R+B/2-B_D)(L+A_D)=(W_2-B_D)(L+A_D+W_R+B_R/2) \quad (2A)$$

$$L_R=\{(W_2-B_D)(L+A_D+W_R+B_R/2)-(B/2-B_D)(L+A_D)\}/(L+A_D) \quad (3A)$$

$$t_{R\_}A=L_R/V_R \quad (4A)$$

$$V_A \geq (A+L+W_R+B_R/2)/t_{R\_}A \quad (5A)$$

The speed zone computation unit 23 specifies a zone that satisfies the condition A in the coordinate illustrated in FIG. 8. Specifically, the speed zone computation unit 23 draws a graph A illustrating min ($V_A$) using the above-described formulas (3A), (4A), and (5A). The speed zone computation unit 23 specifies a speed zone more than or equal to min ($V_A$) as the zone that satisfies the condition A.

<Condition B>

Figure 5:
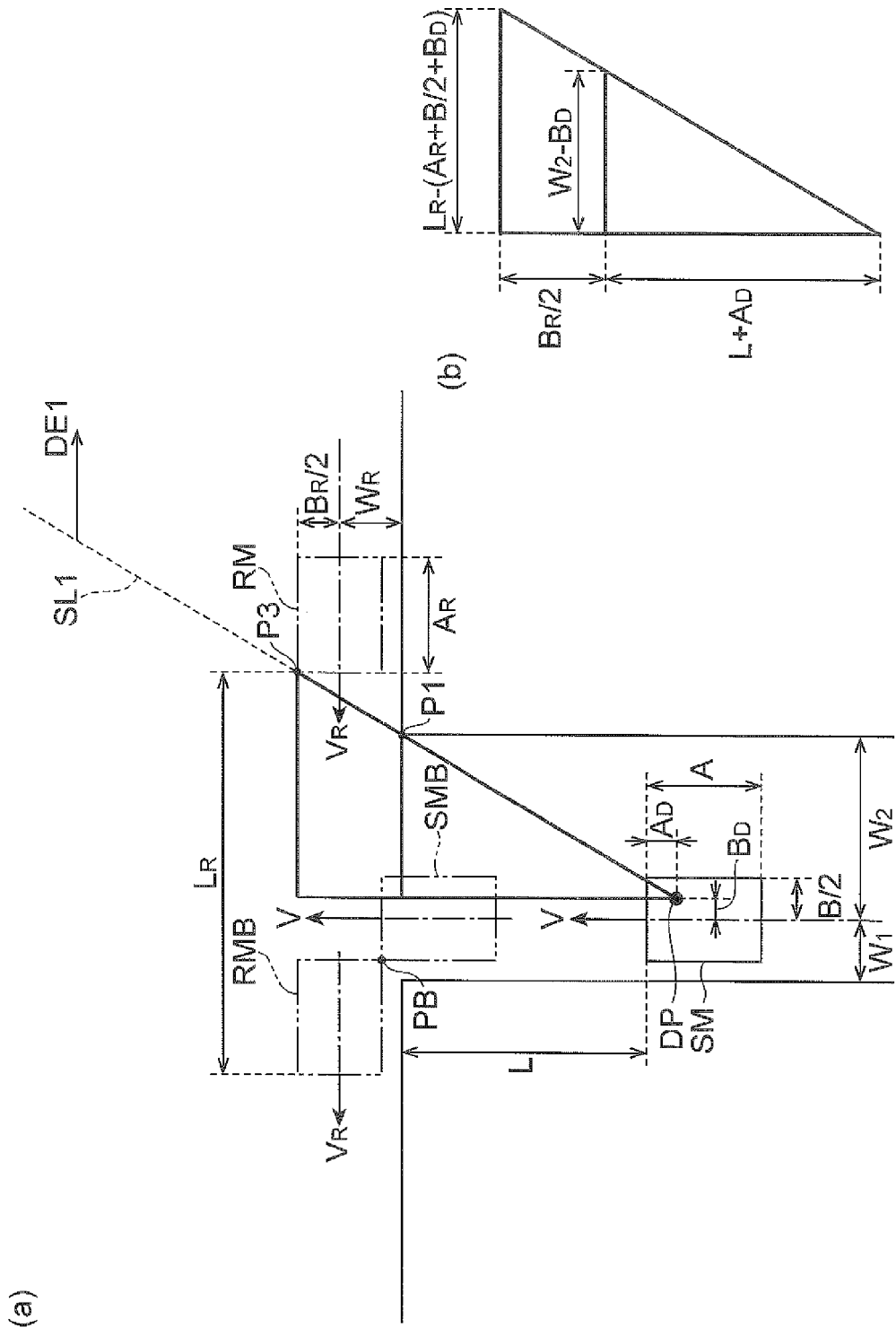
FIG. 5 is a model diagram by which a speed zone computation unit computes a condition B.

FIG. 5 is a model diagram for computing the condition B. In FIG. 5(a), a point PB is illustrated in which a left rear corner of the other vehicle RM and the left front corner of the host vehicle SM overlap each other. At this time, the position of the host vehicle SM is illustrated as SMB, the position of the other vehicle RM is illustrated as RMB. In FIG. 5(a), the distance that the host vehicle SM moves to the position SMA is (L+WR−BR/2). On the other hand, the distance that the other vehicle RM moves to the position RMB is illustrated as $L_R$.

Here, the distance $L_R$ is an unknown quantity, but a right-angled triangle drawn from a positional relationship between the driver DP and the corner P1 and a right-angled triangle drawn from a positional relationship between the driver DP and the corner P3 are in a relationship similar to each other. Thus, the relationship of a formula (1B) is established from the dimensional relationship illustrated in FIG. 5(b). A formula (2B) is figured out by developing the formula (1B), and thereby the distance $L_R$ is represented by a formula (3B). If the time when the other vehicle RM reaches the position RMB is referred to as $t_{R\_}B$, the time $t_{R\_}B$ is illustrated as a formula (4B) using the distance $L_R$. Here, under the condition B, when the other vehicle RM reaches the position RMB (when the time $t_{R\_}B$ elapsed), the moving distance of the host vehicle SM may be less than or equal to the moving distance to the position SMB. In other words, the speed V of the host vehicle SM may be less than or equal to the speed that the host vehicle SM reaches the position SMB after the time $t_{R\_}B$ has elapsed. As described above, when the speed V that satisfies the condition B is referred to as $V_B$, the speed $V_B$ is represented by a formula (5B).

$$L_R+(A_R+B/2+B_D):W_2-B_D=L+A_D+W_R+B_R/2:L+A_D \quad (1B)$$

$$\{L_R-(A_R+B/2+B_D)\}(L+A_D)=(W_2-B_D)(L+A_D+W_R+B_R/2) \quad (2B)$$

$$L_R=\{(W_2-B_D)(L+A_D+W_R+B_R/2)+(A_R+B/2+B_D)(L+A_D)\}/(L+A_D) \quad (3B)$$

$$t_{R\_}B=L_R/V_R \quad (4B)$$

$$V_B \leq L+WR-B_R/2)/t_{R\_}B \quad (5B)$$

The speed zone computation unit 23 specifies a zone that satisfies the condition B in the coordinate illustrated in FIG. 8. Specifically, the speed zone computation unit 23 draws a graph B illustrating max ($V_B$) using the above-described formulas (3B), (4B), and (5B). The speed zone computation unit 23 specifies a speed zone less than or equal to max ($V_B$) as the zone that satisfies the condition B.

<Condition C>

Figure 6:
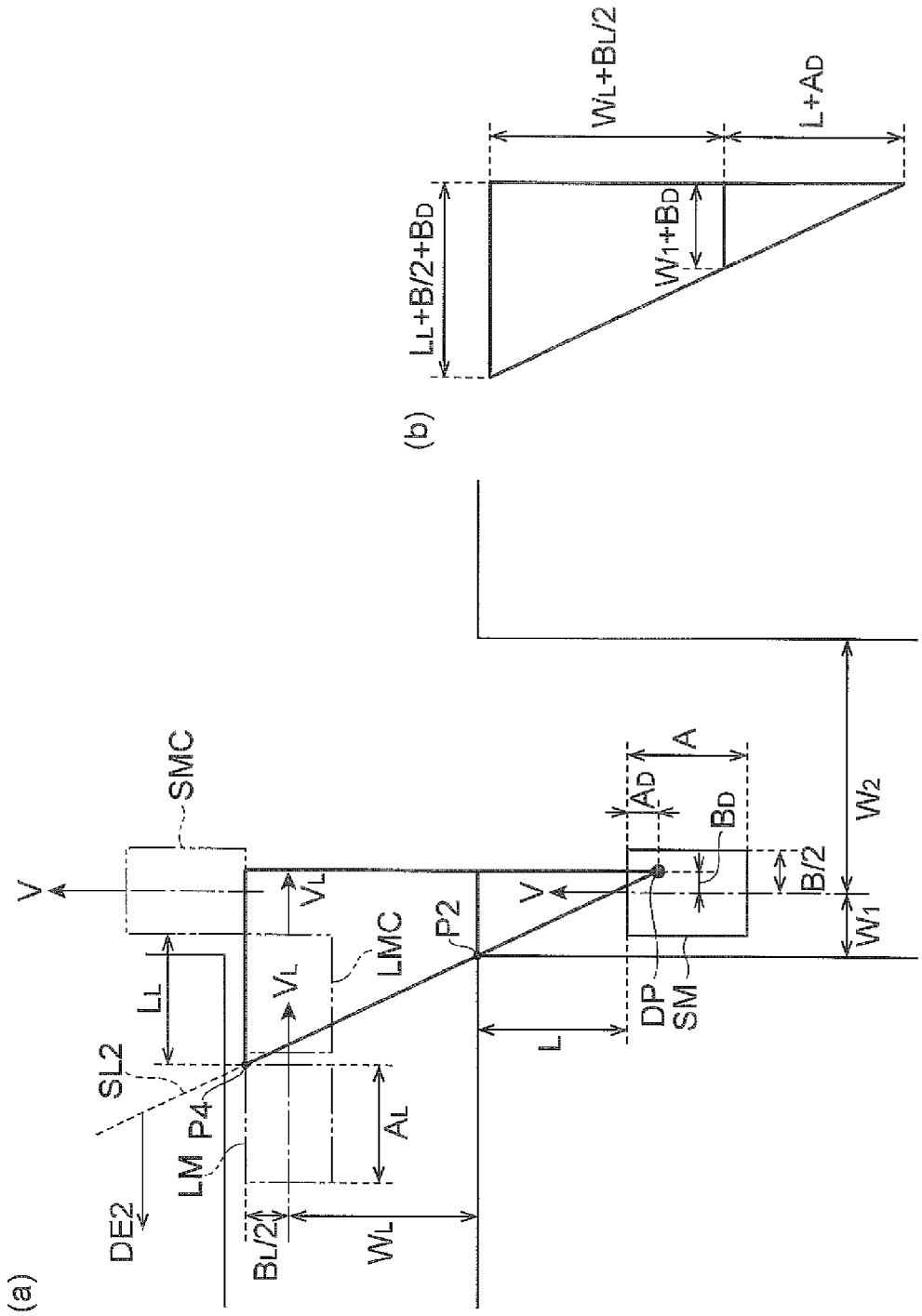
FIG. 6 is a model diagram by which a speed zone computation unit computes a condition C.

FIG. 6 is a model diagram for computing the condition C. In FIG. 6(a), a point PC is illustrated in which a left front corner of the other vehicle LM and the left rear corner of the host vehicle SM overlap each other. At this time, the position of the host vehicle SM is illustrated as SMC, the position of the other vehicle LM is illustrated as LMC. In FIG. 6(a), the distance that the host vehicle SM moves to the position SMC is (L+$W_L$+$B_L$/2+A). On the other hand, the distance that the other vehicle LM moves to the position LMC is illustrated as $L_L$.

Here, the distance $L_L$ is an unknown quantity, but a right-angled triangle drawn from a positional relationship between the driver DP and the corner P2 and a right-angled triangle drawn from a positional relationship between the driver DP and the corner P4 are in a relationship similar to each other. Thus, the relationship of a formula (1C) is established from the dimensional relationship illustrated in FIG. 6(b). A formula (2C) is figured out by developing the formula (1C), and thereby the distance $L_L$ is represented by a formula (3C). If the time when the other vehicle LM reaches the position LMC is referred to as $t_{L\_}C$, the time $t_{L\_}C$ is illustrated as a formula (4C) using the distance $L_L$. Here, under the condition C, when the other vehicle LM reaches the position LMC (when the time $t_{L\_}C$ elapsed), the moving distance of the host vehicle SM may be more than or equal to the moving distance to the position SMC. In other words, the speed V of the host vehicle SM may be more than or equal to the speed that the host vehicle reaches the position SMC after the time $t_{L\_}C$ has elapsed. As described above, when the speed V that satisfies the condition C is referred to as $V_C$, the speed $V_C$ is represented by a formula (5C).

$$L_L+B/2+B_D:W_1-B_D=L+A_D+W_L+B_L/2:L+A_D \quad (1C)$$

$$(L_L+B/2+B_D)(L+A_D)=(W_1+B_D)(L+A_D+W_L+B_L/2) \quad (2C)$$

$$L_L=\{(W_1+B_D)(L+A_D+W_L+B_L/2)-(B/2+B_D)(L+A_D)\}/(L+A_D) \quad (3C)$$

$$t_{L\_}C=L_L/V_L \quad (4C)$$

$$V_C(A+L+W_L+B_L/2)/t_{L\_}C \quad (5C)$$

The speed zone computation unit 23 specifies a zone that satisfies the condition C in the coordinate illustrated in FIG. 8. Specifically, the speed zone computation unit 23 draws a graph C illustrating min ($V_C$) using the above-described formulas (3C), (4C), and (5C). The speed zone computation unit 23 specifies a speed zone more than or equal to min ($V_C$) as the zone that satisfies the condition C.

<Condition D>

Figure 7:
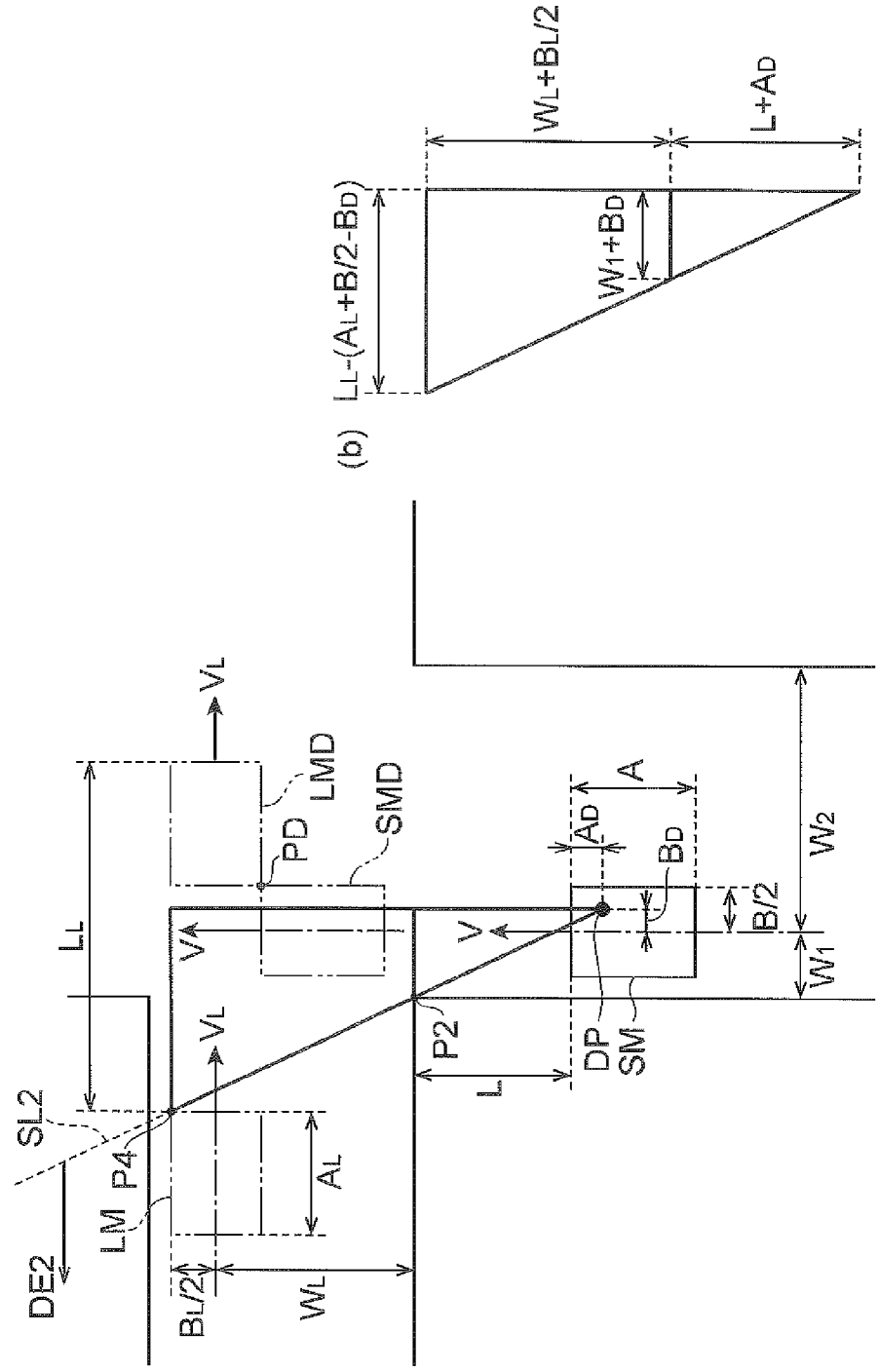
FIG. 7 is a model diagram by which a speed zone computation unit computes a condition D.

FIG. 7 is a model diagram for computing the condition D. In FIG. 7(a), a point PD is illustrated in which a right rear corner of the other vehicle LM and the right front corner of the host vehicle SM overlap each other. At this time, the position of the host vehicle SM is illustrated as SMD, the position of the other vehicle LM is illustrated as LMD. In FIG. 7(a), the distance that the host vehicle SM moves to the position SMD is ($L+W_L-B_L/2$). On the other hand, the distance that the other vehicle LM moves to the position LMD is illustrated as $L_L$.

Here, the distance $L_L$ is an unknown quantity, but a right-angled triangle drawn from a position relationship between the driver DP and the corner P2 and a right-angled triangle drawn from a position relationship between the driver DP and the corner P4 are in a relationship similar to each other. Thus, the relationship of a formula (1D) is established from the dimensional relationship illustrated in FIG. 7(b). A formula (2D) is figured out by developing the formula (1D), and thereby the distance $L_L$ is represented by a formula (3D). If the time when the other vehicle LM reaches the position LMD is referred to as $t_{L\_D}$, the time $t_{L\_D}$ is illustrated as a formula (4D) using the distance $L_L$. Here, under the condition D, when the other vehicle LM reaches the position LMD (when the time $t_{L\_D}$ elapsed), the moving distance of the host vehicle SM may be less than or equal to the moving distance to the position SMD. In other words, the speed V of the host vehicle SM may be less than or equal to the speed that the host vehicle reaches the position SMD after the time $t_{L\_D}$ has elapsed. As described above, when the speed V that satisfies the condition D is referred to as $V_D$, the speed $V_D$ is represented by a formula (5D).

$$L_L-(A_L+B/2-B_D):W_2+B_D=L+A_D+W_L+B_L/2:L+A_D \quad (1D)$$

$$\{L_L-(A_L+B/2-B_D)\}(L+A_D)=(W_1+B_D)(L+A_D+W_L+B_L/2) \quad (2D)$$

$$L_L=\{(W_1+B_D)(L+A_D+W_L+B_L/2)+(A_L+B/2-B_D)(L+A_D)\}/(L+A_D) \quad (3D)$$

$$t_{L\_D}=L_L/V_L \quad (4D)$$

$$V_D \leq L+W_L-B_L/2)/t_{L\_D} \quad (5D)$$

The speed zone computation unit 23 specifies a zone that satisfies the condition D in the coordinate illustrated in FIG. 8. Specifically, the speed zone computation unit 23 draws a graph D illustrating max ($V_D$) using the above-described formulas (3D), (4D), and (5D). The speed zone computation unit 23 specifies a speed zone less than or equal to max ($V_D$) as the zone that satisfies the condition D.

Based on the above-described computation, the speed zone computation unit 23 sets the speed zone of max ($V_B$, $V_D$)<V<min ($V_A$, $V_C$) as the danger zone DZ, as illustrated in FIG. 8. In addition, the graphs A to D are formed in curves in an actual computation, but the graphs A to D in FIG. 8 which are conceptual diagrams are illustrated as straight lines in order to facilitate the understanding.

Here, the danger zone will be described. When the host vehicle SM reaches a position of a predetermined distance L, it is assumed that the speed V of the host vehicle SM is in the danger zone DZ. In this state, when the other vehicles RM and LM rush out of the blind spots DE1 and DE2 at the next instant, if the host vehicle SM travels at a constant speed in a constant lateral position by the speed V, the host vehicle SM can come into contact with the other vehicles RM and LM. If the other vehicles RM and LM rush out, it causes the host vehicle SM to perform sudden braking or a sudden steering. In other words, when a speed condition of the host vehicle SM is in the danger zone DZ, and when the other vehicles RM and LM rush out of the blind spots DE1 and DE2 at the next instant, there is a possibility of the collision. Thus, it is preferred that the host vehicle SM travels by avoiding the danger zone DZ.

Specifically, as illustrated in FIG. 8, a case where the speeds of the host vehicle SM are $V_1$, $V_2$, and $V_3$ respectively at the time of a distance $L_S$ will be described. The speed $V_1$ is faster than min ($V_A$, $V_C$), and thus even when the other vehicles RM and LM rush out at the next instance, the host vehicle SM can pass through the intersection earlier than other vehicles such as RM and LM. The speed $V_2$ is in the danger zone DZ, and thus when the other vehicles RM and LM rush out at the next instance, the host vehicle SM can come into contact with the other vehicles RM and LM (when the sudden braking or the sudden steering is not performed). The speed $V_3$ is slower than max ($V_B$, $V_D$), and thus even when the other vehicles RM and LM rush out at the next instance, the host vehicle SM can pass through the intersection after going past such other vehicles. However, when the host vehicle approaches the blind spot entry point by continuing to travel at the speed $V_3$ (when L is close to zero), the speed $V_3$ enters the danger zone DZ.

Figure 9:
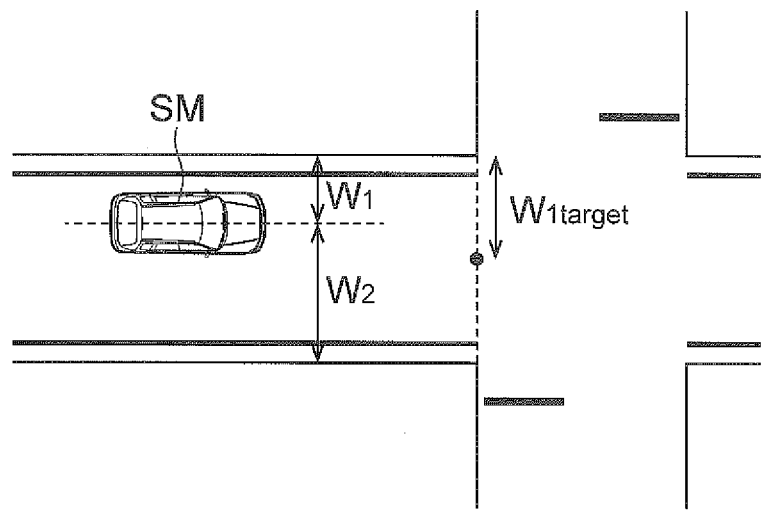
FIG. 9 is a diagram for explaining a side space.

Next, the target lateral position computation unit 25 computes the target lateral position of the host vehicle SM, based on the danger zone DZ computed in step S120 (step S130). As illustrated in FIG. 9, the road has a constant width, and a left side space $W_1$ and a right side space $W_2$ are different from each other in the lateral position of the host vehicle SM. For example, when the left side space $W_1$ is narrower than the right side space, the left blind spot DE2 is increased, and when the right side space $W_2$ is narrower than the left side space, the right blind spot DE1 is increased. In other words, the lateral position of the host vehicle SM has an effect on safety. In step S130, the target lateral position computation unit 25 computes a target side space $W_{1target}$ that can increase safety. The target side space $W_{1target}$ is the target lateral position of the host vehicle SM at the blind spot entry point (L=0).

When the processing of step S130 is performed, the speed zone computation unit 23 computes the danger zone DZ with respect to the side spaces ($W_1$, $W_2$) of a plurality of patterns in advance and stores the computed danger zone as a map. In addition, since the speed zone computation unit 23 can specify the blind spots DE1 and DE2 using a computation, even under a positional condition different from the actual position of the host vehicle SM while computing, the danger zone DZ with respect to the side spaces ($W_1$, $W_2$) of the plurality of patterns can be computed.

Figure 10:
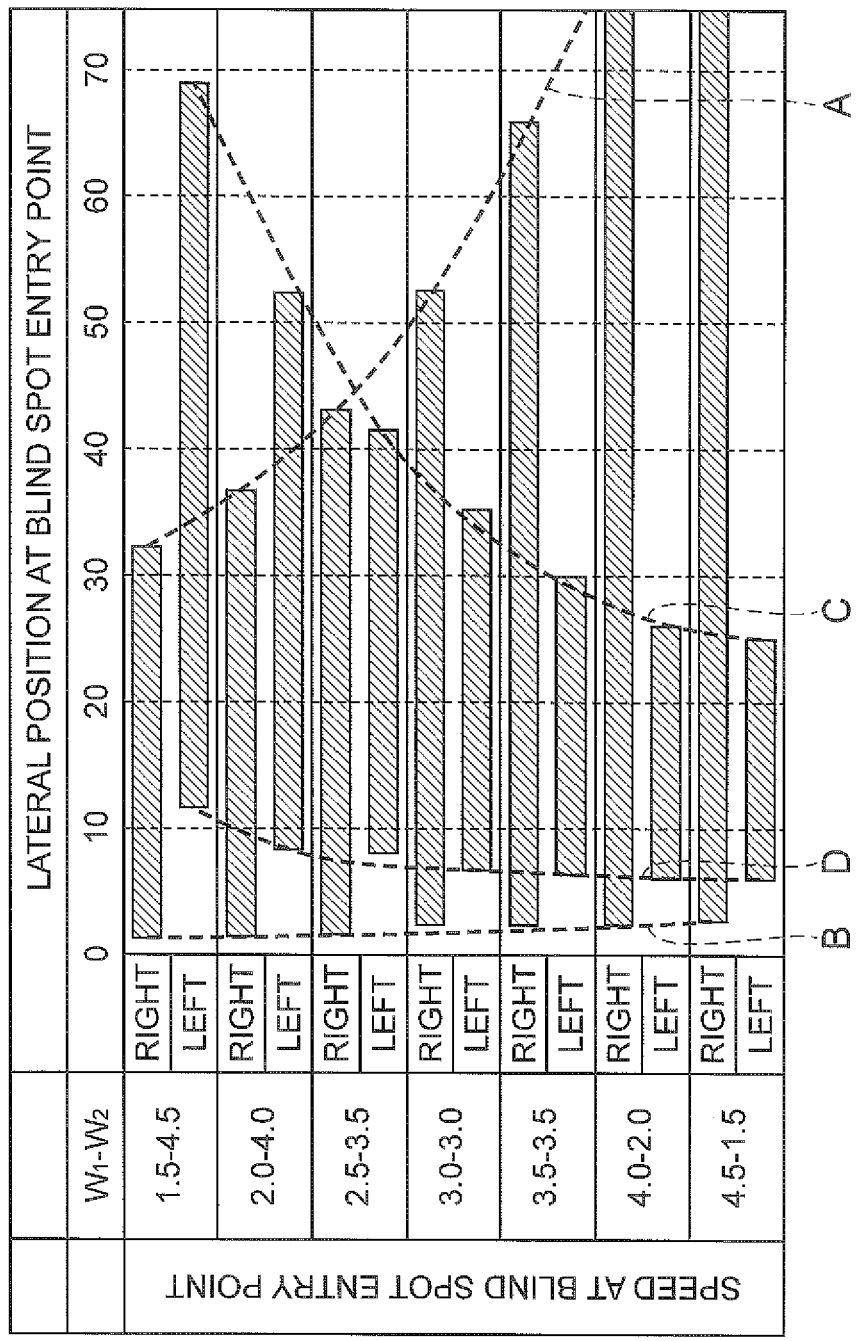
FIG. 10 is an example of a map illustrating a relationship between speed at a blind spot entry point and a lateral position of a vehicle.

An example of a map is illustrated in FIG. 10. This map extracts the speed at the blind spot entry point (L=0) in the danger zone DZ and is associated with each pattern of the side spaces ($W_1$, $W_2$). A in FIG. 10 shows a relationship between min ($V_A$) in L=0 and the side spaces ($W_1$, $W_2$). B in FIG. 10 shows a relationship between max ($V_B$) in L=0 and the side spaces ($W_1$, $W_2$). C in FIG. 10 shows a relationship between min ($V_C$) in L=0 and the side spaces ($W_1$, $W_2$). D in FIG. 10 shows a relationship between max ($V_D$) in L=0 and the side spaces ($W_1$, $W_2$). If the lateral position is deflected to the left ($W_1$ is small), the other vehicle LM from the left becomes difficult to see, and thus min ($V_C$) becomes large. If the lateral position is deflected to the right ($W_2$ is small), the other vehicle RM from the right becomes difficult to see, and thus min ($V_A$) becomes large. A lower limit value (a maximum value in the speed lower than that in the danger zone) of the danger zone in the map is predetermined by a smaller value of max($V_B$) and max ($V_D$). In FIG. 10, max ($V_B$) is set as the lower limit value, even at any side spaces. An upper limit value (a minimum value in the speed higher than that in the danger zone) of the danger zone in the map is predetermined by a larger value of min ($V_A$) and min ($V_C$). In FIG. 10, the side spaces ($W_1$, $W_2$)=(4.5, 1.5) are set as a boundary, whereby, min ($V_C$) is set as the upper limit value in a zone of a left deflection, and min ($V_A$) is set as the upper limit value in a zone of a right deflection.

The target lateral position computation unit 25 sets an optimal target lateral position, based on the map illustrated in FIG. 10. For example, the target lateral position computation unit 25 sets the side space when the lower limit value of the danger zone becomes the largest value, as the target side space $W_{1target}$. In FIG. 10, max ($V_B$) becomes the largest value, in the side spaces ($W_1$, $W_2$)=(4.5, 1.5). Alternatively, the target lateral position computation unit 25 sets the side space when a difference between the lower limit value and the upper limit value becomes the smallest value, as the target side space $W_{1target}$. In FIG. 10, the difference between the upper limit value and the lower limit value becomes the smallest value, in the side spaces ($W_1$, $W_2$)=(2.5, 3.5) which are the position where min ($V_A$) is intersected with min ($V_C$).

Next, the target speed computation unit 24 computes the target speed $V_{target}$ of the host vehicle SM, based on the danger zone DZ computed in step S120 (step S140). The target speed computation unit 24 sets the speed which can avoid the danger zone DZ regardless of the distance L, as the target speed $V_{target}$. Here, the target speed computation unit 24 sets a smaller value of max ($V_B$) and max ($V_D$) in the lower limit value (the maximum value in the lower speed than that in the danger zone) of the danger zone, namely, in L=0, as the target speed $V_{target}$. In FIG. 8, max ($V_B$) in L=0 is set as the lower limit value, and thereby being set as the target speed $V_{target}$. At this time, the target speed $V_{target}$ may be lower than the speed range of the danger zone DZ in L=0, and a value lower than max ($V_B$) may be set as the target speed $V_{target}$. In addition, when the target lateral position is set in step S130, the target speed computation unit 24 computes the target speed $V_{target}$ using the danger zone DZ corresponding to the target lateral position.

Next, the driving assistance control unit 31 determines whether there is a necessity of the driving assistance, based on the target lateral position computed in step S130, the target speed computed in step S140, and the actual lateral position and speed of the host vehicle SM (step S150). Specifically, the driving assistance control unit 31 determines whether or not the current side space $W_{1now}$ of the host vehicle SM is different from the target side space $W_{1target}$ (the difference is larger than the threshold value). When the current side space is determined to be equal to the target side space, the driving assistance control unit 31 determines that the driving assistance for the lateral position adjustment is not required. When the current side space is determined to be different from the target side space, the driving assistance control unit 31 determines that the driving assistance for the lateral position adjustment is required. In addition, the driving assistance control unit 31 determines whether or not the current speed $V_{now}$ of the host vehicle SM is higher than the target speed $V_{target}$. When the current speed $V_{now}$ is determined to be lower than the target speed $V_{target}$, the driving assistance control unit 31 determines that the driving assistance for the speed adjustment is not required. When the current speed $V_{now}$ is determined to be higher than the target speed $V_{target}$, the driving assistance control unit 31 determines that the driving assistance for the speed adjustment is required. In step S150, when no driving assistance is determined to be required, the control processing illustrated in FIG. 3 is ended. On the other hand, when at least one processing is determined to be required, the processing proceeds to step S160. For example, since the speed $V_{now}$ illustrated in FIG. 8 enters the danger zone DZ when the host vehicle approaches the blind spot entry point, the driving assistance is required.

When it is determined that the driving assistance is required in step S150, the target speed profile creation unit 32 creates the target speed profile VPR with respect to the danger zone DZ (step S170). In addition, in the present embodiment, the target speed $V_{target}$ computed in step S140 corresponds to the target speed at the blind spot entry point SDL (L=0), that is, the blind spot entry target speed which is the speed of the host vehicle SM at the time of entering the position forming the blind spot. In addition, the speed $V_{now}$ is the current speed of the host vehicle SM. Thus, hereinafter, description will be made by referring to these as "blind spot entry target speed $V_{target}$" and "current speed $V_{now}$". In addition, in the following description, with reference to FIG. 13, the target acceleration a for deceleration is set, and an example in which the first computation method that computes the first target position (L=L1) and the second target position (L=L2) is employed based on the setting will be described.

The target speed profile creation unit 32 first sets the target acceleration a (a<0 because of deceleration) for performing a deceleration assistance. The target acceleration a is set as a constant acceleration. As the target acceleration a, a value which is set in advance, a value in accordance with the driver, or the like can be used. As illustrated in a graph on a lower side of FIG. 13, the acceleration becomes zero at an area between the current position (L=$L_{now}$) of the host vehicle SM and the second target position (L=L2), the target acceleration a decreases constantly at an area between the second target position (L=L2) during a deceleration assistance and the first target position (L=L1), and the acceleration becomes zero at an area between the first target position (L=L1) and the position (L=0) of the blind spot entry point SDL. As a result, as illustrated in a graph on an upper side of FIG. 13, a constant uniform speed line PR1 is depicted due to V (speed)=$V_{now}$ (current speed) between the current position (L=$L_{now}$) of the host vehicle SM and the second target position (L=L2), a curve of a uniform acceleration deceleration line PR2 which is decreased by the target acceleration a is depicted between the second target position (L=L2) during the deceleration assistance and the first target position (L=L1), and a constant uniform acceleration line PR3 due to V (speed)=$V_{target}$ (blind spot entry target speed) is depicted between the first target position (L=L1) and the position (L=0) of the blind spot entry position SDL.

Based on the current speed $V_{now}$, the blind spot entry target speed $V_{target}$, and the target acceleration a, the target speed profile creation unit 32 computes a contact point T (L=L3) when the uniform acceleration deceleration line PR2 contacts a danger zone entry line DA in the danger zone DZ, the first target position (L=L1), and the second target position (L=L2). The danger zone entry line DA is formed in a boundary line which contacts an area in which a point of the current speed $V_{now}$ exists, among the boundary lines which determine the danger zones DZ. In addition, the danger zone entry line DA (boundary line) may by a curve or a straight line which determines the danger zone DZ, and may be an approximate line which is set with respect to the curve or the straight line. When the danger zone DZ is determined as illustrated in FIG. 8, the danger zone entry line DA is set based on a graph B in FIG. 8. A function fDA(L) of the speed V representing the danger zone entry line DA is represented by a formula (6). In addition, b in the formula (6) is an integer value which can be calculated at the time of computing the danger zone DZ in step S120. In contrast, a function fC(L) of the speed V representing the uniform acceleration deceleration line PR2 is represented by a formula (7).

$$V = b \times L + V_{target} = fDA(L) \qquad (6)$$

$$V = \sqrt{\{-2a \times (L-L1)\}} + V_{target} = fC(L). \qquad (7)$$

A condition for the danger zone entry line DA contacting the uniform acceleration deceleration line PR2 is that the speeds V of both and differentiated values thereof become equal, in the contact point T (L=L3). That is, the following formulas (8) and (9) are established. In addition, if fC(L) is differentiated with respect to a distance L, a formula (10) is established.

$$fDA(L3) = fC(L3) \qquad (8)$$

$$f'DA(L3) = f'C(L3) \qquad (9)$$

$$f'C(L) = -a/\sqrt{\{-2a \times (L-L1)\}} \qquad (10)$$

By using the formula (6) and the formula (7), the formula (8) is represented by a formula (11), and the formula (9) is represented by a formula (12). In addition, from the formula (11) and the formula (12), the position (L=L3) of the contact point T is computed as represented by a formula (13), and the first target position (L=L1) at which the speed V of the host vehicle SM becomes the blind spot entry target speed $V_{target}$ is computed as represented by a formula (14).

$$b \times L3 + VA_{target} = \sqrt{\{-2a \times (L3-L1)\}} + V_{target} \qquad (11)$$

$$b = -a/\sqrt{t\{-2a \times (L3-L1)\}} \qquad (12)$$

$$L3 = -a/b^2 \qquad (13)$$

$$L1 = -a/2/b^2 \qquad (14)$$

In addition, since the speed V is the current speed $V_{now}$ at the second position (L=L2) at which the deceleration is started, a formula (15) is established by assigning L=L2 and $V = V_{now}$ to the formula (7), and the second target position (L=L2) such as represented by a formula (16) is computed from the formula (15).

$$V_{now} = \sqrt{\{-2a \times (L2-L1)\}} + V_{target} \qquad (15)$$

$$L2 = (V_{now} - V_{target})^2/(-2a) + L1 \qquad (16)$$

As a result, the target speed profile VPR is represented by the following formula (17).

$$V = V_{now} (L > L2)$$

$$V = \sqrt{\{-2a \times (L-L1)\}} + V_{target}$$

$$(L2 \geq L > L1)$$

$$V = V_{target} (L1 \geq L) \qquad (17)$$

In addition, the target speed profile creation unit 32 may use the second computation method which first sets the first target position (L=L1), and computes the target acceleration a and the second target position (L=L2) based on the setting. In addition, the target speed profile creation unit 32 may use the third computation method which first sets the second target position (L=L2), and computes the target acceleration a and the first target position (L=L1) based on the setting. When the second computation method and the third computation method are employed, the target speed profile creation unit 32 calculates each computation value using a computation method with the same principles as those of the above-described formula (6) to formula (17).

In addition, the target speed profile creation unit 32 studies the characteristics of the driver, and may determine one computation method, among the first computation method, the second computation method, and the third computation method, based on the characteristics of the driver. The speed profile at the time of entering the intersection changes in characteristics depending on the driver, and a computation method corresponding to such characteristics can be employed. With respect to a driver with characteristics in which acceleration may be said to decrease constantly, the first computation method of setting the target acceleration a is employed. The deceleration is performed at a position a predetermined distance before the blind spot entry position SDL up to the target speed, and with respect to a driver with characteristics in which a distance may be said to be constant, the second computation method of setting the first target position (L=L1) is employed. The deceleration is started at a position a predetermined distance before the blind spot entry position SDL, and with respect to the driver with the characteristics in which the distance may be said to be constant, the third computation method of setting the second target position (L=L2) is employed. Specifically, in daily driving, the target speed profile creation unit 32 analyzes what kind of speed profile will be depicted when the host vehicle SM enters the intersection, calculates a value corresponding to the above-described a, L1, and L2, and stores the calculated value in the information storage unit 7. In addition, the target speed profile creation unit 32 calculates dispersion values of the values of the a, L1, and L2, and according to the smallest value (that is, the value tends to be constant) of standardized dispersion values (which are obtained by dividing the dispersion values by a maximum value), determines which of the first computation method, the second computation method, and the third computation method to employ.

The driving assistance control unit 31, based on the result determined in step S150, performs a driving assistance for moving the host vehicle SM to the target lateral position, and a driving assistance for setting the speed of the host vehicle SM to the target speed (step S160). In the present embodiment, the driving assistance control unit 31 performs the driving assistance such as the deceleration, according to the target speed profile created in step S170. For example, the driving assistance control unit 31 may decelerate forcibly according to the target speed profile by controlling the travel assistance unit 11. In addition to this, the driving assistance control unit 31 may perform a notification to the effect that it is decelerating to the target speed $V_{target}$ with respect to the driver DP through the display unit 8 or the voice generation unit 9, or a notification to the effect that it is decelerating according to the target speed profile. The driving assistance control unit 31 may move forcibly the host vehicle SM to the target side space $W_{1target}$ by controlling the travel assistance unit 11. Alternatively, the driving assistance control unit 31 may perform a notification to the effect that the host vehicle SM is moving to the target side space $W_{1target}$ with respect to driver DP through the display unit 8 or the voice generation unit 9. In addition, as the driving assistance regarding the lateral position, only one of the forcible driving assistance and a driving assistance according to the notification may be performed, and the forcible driving assistance and a driving assistance according to the notification may be performed simultaneously. In addition, only one of the driving assistance for setting to the target speed $V_{target}$ and the driving assistance for setting to the target side space $W_{1target}$ may be performed, both may be performed by staggering the timings, and both may be performed simultaneously.

When the blind spots exists in a plurality of directions as described in the present embodiments, the driving assistance control unit 31 may determine the danger direction with the high degree of danger, based on the danger zone DZ. For example, as illustrated in the graph of FIG. 8, the lower limit value of the danger zone DZ is determined by min ($V_B$) according to the condition on the right. From this, we can see that a vehicle appearing suddenly from the right has a danger higher than a vehicle appearing suddenly from the left. In addition, according to a shape of the intersection or an entry aspect of the host vehicle SM, there is also a case where the vehicle appearing suddenly from the left has a high danger. So, the driving assistance control unit 31 determines the danger direction with a high degree of danger, and may call the attention to the driver DP so as to allow the driver to turn to the danger direction. For example, the driving assistance control unit 31 may increase an alarm sound on the right, increase display on the right in the display unit 8, or change color to an alert color.

In addition, the driving assistance control unit 31 may consider the viewing direction of the driver DP. The driving assistance control unit 31 acquires the detection result of the viewing direction detection unit 29, and determines whether or not the computed danger direction coincides with the driver's viewing direction. The driving assistance control unit 31 can weaken the driving assistance at the time when the driver turn to the danger direction and strengthen the driving assistance at the time when the driver does not turn to the danger direction, based on the determined result. For example, the driving assistance control unit 31 performs the control illustrated in FIG. 12. For example, a strong driving assistance is to increase the strength of the brake, or to make start timing of the driving assistance fast.

The processing of step S160 is ended, whereby the control processing illustrated in FIG. 3 is ended, and the processing starts again from step S100.

Next, an operation and advantages of the driving assistance device 1 according to the present embodiment will be described.

In the driving assistance device 1 according to the present embodiment, the mobile object information setting unit 22 predicts a mobile object with the possibility of appearing suddenly from the blind spot, and sets the mobile object information regarding the mobile object. In addition, the speed zone computation unit 23 can compute the travel speed of the host vehicle having a possibility of the collision with the mobile object, based on the assumed speed of the mobile object predicted to rush out of the blind spot. Then, the speed zone computation unit 23 can compute the speed zone (danger zone DZ) that has a possibility of contacting the mobile object. The target speed computation unit 24 computes the target speed, based on the computed speed zone. In this way, the driving assistance device 1 does not compare the mobile object which is assumed with a course prediction result of the host vehicle SM, computes the speed zone that has the possibility of contacting the mobile object, and computes the target speed based on the computation of the speed zone. In this way, the driving assistance device 1 can perform the control based on the specific target speed indicating which speed is better to travel, and thus perform the driving assistance to ensure a high level of safety. In addition, the driving assistance of the driving assistance device 1 is not influenced by the accuracy of the course prediction of the host vehicle, and thus the driving assistance device 1 can perform an appropriate driving assistance. As described above, the driving assistance device 1 performs the appropriate driving assistance, and can improve the safety even more.

In addition, the driving assistance device does not perform the driving assistance from when detecting that the mobile object actually rushes out of the blind spot, and can perform the driving assistance by predicting the mobile object (and assumed speed) regardless of the actual rushing. When the blind spot passes through the intersection, the driving assistance device 1 computes the target speed after predicting the danger to be assumed in advance, and thus it is possible to perform the driving assistance to improve the safety even more, even when the mobile object actually rushes out of the blind spot.

The driving assistance device 1 includes the target lateral position computation unit 25 which computes the target lateral position of the host vehicle SM, based on the speed zone computed by the speed zone computation unit 23. The size of the blind spot is changed by the lateral position of the host vehicle SM, and thereby the degree of danger of contacting the mobile object is also changed. Thus, the driving assistance device 1 can perform the appropriate driving assistance in such a manner that the host vehicle SM can travel in a lateral position with a high level of safety, using the computation of the target lateral position performed by the target lateral position computation unit 25.

In the driving assistance device 1, the mobile object information setting unit 22 may set the mobile object information, based on the road shape forming the blind spot. The behavior of the mobile object having the possibility of appearing suddenly from the blind spot is influenced by the road shape. The driving assistance device 1 can perform the driving assistance with a higher accuracy, in consideration of the road shape.

In the driving assistance device 1, the mobile object information setting unit 22 may set the mobile object information, based on the ratio between a traffic lane width of the mobile object side and a traffic lane width of the host vehicle side. In this way, the driving assistance device 1 can perform the driving assistance which is more appropriate for the driver's sense and the actual rushing speed of the mobile object, in consideration of the ratio of the respective traffic lanes.

In the driving assistance device 1, the mobile object information setting unit 22 may set the mobile object information, based on the surrounding environment of the blind spot. In this way, in consideration of the surrounding environment of the blind spot, the driving assistance device 1 can perform the driving assistance which is more appropriate for the driver's sense.

The driving assistance device 1 includes the traffic information acquisition unit 26 which acquires the traffic information regarding the road configuring the blind spot. The mobile object information setting unit 22 may set the mobile object information, based on the traffic information acquired by traffic information acquisition unit 26. In this way, when passing through the blind spot road with a really high degree of danger, the driving assistance device 1 can perform a valid driving assistance that can improve the safety even more, in consideration of the traffic information that cannot be known only from the information around the blind spot.

The driving assistance device 1 includes the experience information acquisition unit 27 which acquires the past experience information of the driver. The mobile object information setting unit 22 may set the mobile object information, based on the experience information acquired by the experience information acquisition unit 27. In this way, the driving assistance device 1 can perform the driving assistance which is appropriate to the driver's experience, by using the past experience information of the driver.

The driving assistance device 1 includes the object information acquisition unit 28 which acquires the object information regarding the behavior of the object present around the host vehicle. The mobile object information setting unit 22 may set the mobile object information, based on the object information acquired by the object information acquisition unit 28. The behavior of the object around the host vehicle also influences the speed of the mobile object which rushes out or the like, but the driving assistance device 1 can perform the driving assistance which is appropriate to a more actual situation, in consideration of such information.

The driving assistance device 1 includes the driving assistance control unit 31 which calls the driver's attention to a blind spot. When a blind spot exists in a plurality of directions, based on the shape of the speed zone computed by the speed zone computation unit 23, the driving assistance control unit 31 may determine the danger direction with a high degree of danger, and control calling attention so that the driver can turn to the danger direction. In this way, the driving assistance device 1 performs calling attention in such a manner that the driver can turn to the danger direction with the high degree of danger, and thus the effect of preventing danger can be increased.

The driving assistance device 1 includes the viewing direction detection unit 29 which detects the viewing direction of the driver. The driving assistance control unit 31 may control the calling attention, based on the danger direction and the viewing direction. In this way, the calling attention is controlled by considering the viewing direction of the driver, and thus hassle to the driver is decreased and a further effective driving assistance can be performed in a situation where the driving assistance is actually required.

Furthermore, the driving assistance device 1 includes the target speed profile creation unit 32 which creates the target speed profile VPR for decelerating the host vehicle from the current speed $V_{now}$ to the blind spot entry target speed $V_{target}$ at the time of entering the blind spot entry point SDL. Thus, the driving assistance device 1 can perform finally the driving assistance in which it is considered not only at which speed the host vehicle may enter the blind spot entry point SDL but also how much the host vehicle may decelerate while reaching there. Accordingly, a more appropriate driving assistance can be performed. As described above, the driving assistance device 1 performs an appropriate driving assistance and thus, the driving assistance device 1 can improve the safety even more.

In the driving assistance device 1, the target speed profile creation unit 32 can create the target speed profile VPR by computing the contact point T of the danger zone entry line DA which is the boundary line of the danger zone DZ, and the target speed profile VPR. For example, when the driving assistance is performed according to the target speed profile which avoids the danger zone DZ too much, there is a case where the driver feels cumbersome. However, since the target speed profile creation unit 32 creates the target speed profile VPR by computing the contact point T of the danger zone entry line DA of the danger zone DZ and the target speed profile VPR, the safety is ensured so as not to enter the danger zone DZ, and it is possible to suppress the cumbersome feeling due to an excessive driving assistance.

In the driving assistance device 1, the target speed profile creation unit 32 may create the target speed profile VPR, based on a constant target acceleration a, the first target position (L=L1) at which the speed of the host vehicle SM is set to the blind spot entry target speed $V_{target}$ in front of the blind spot, and the second target position (L=L2) at which the deceleration according to the target acceleration a is started. Accordingly, the target speed profile creation unit 32 starts the deceleration according to a constant acceleration at the second target position (L=L2), and in a state of setting to the blind spot entry target speed $V_{target}$ at the first target position (L=L1) in front of the blind spot, can create the target speed profile such as that for entering the blind spot. Accordingly, the driving assistance device 1 can perform the driving assistance in which the speed profile of the driver is realized with a high and safe driving technology.

In the driving assistance device 1, the target speed profile creation unit 32 may create the target speed profile VPR using at least one computation method, among the first computation method which computes the first target position (L=L1) and the second target position (L=L2) after the target acceleration a is set, the second computation method which computes the target acceleration a and the second target position (L=L2) after the first target position (L=L1) is set, and the third computation method which computes the target acceleration a and the first target position (L=L1) after the second target position (L=L2) is set, Accordingly, it is possible to create the target speed profile VPR using an appropriate computation method depending on the situation.

In the driving assistance device 1, the target speed profile creation unit 32 studies the characteristics of the driver, and may determine one computation method, among the first computation method, the second computation method, and the third computation method, based on the characteristics of the driver. Accordingly, it is possible to create the target speed profile VPR using an appropriate computation method depending on the characteristics of the driver, and to perform the driving assistance in which a sense of discomfort to the driver is reduced.

The present invention is not limited to the above-described embodiments.

For example, other vehicles are exemplified as the mobile object, but anything, having a possibility of appearing suddenly from the blind spot, such as a two-wheel vehicle may be used. Depending on the type of the mobile object, the mobile object information to be set is changed.

In addition, in the above-described embodiments, in order for the mobile object information setting unit 22 to set the mobile object information, various factors are considered, but all the factors are not required to be considered, and a portion or any one of the factors may be considered.

In the present embodiments, the danger zone DZ is set with respect to the distance of the host vehicle before the blind spot entry point, without particularly providing a range, but may be set as a limit with a constant range such as "0≤L≤×1". In addition, the danger zone DZ may be set with respect to only a predetermined L, and the danger zone DZ may be set with respect to only the portion of L=0, for example (that is, the target speed is set based on only the speed zone at L=0).

In addition, the target speed profile may be created not only in the forms described in the present embodiments but also in all forms. For example, the target speed profile may not contact the danger zone entry line DA, and may be separated in order to further ensure the safety. In addition, the target acceleration may be set as a constant acceleration, but the target acceleration is set to multiple values and divided into several stages, and according to this, it may be decreased. The target acceleration may be changed gradually depending on the distance L.

INDUSTRIAL APPLICABILITY

The present invention can be applied to a driving assistance device.

REFERENCE SIGNS LIST

1 . . . driving assistance device, 21 . . . blind spot recognition unit, 22 . . . mobile object information setting unit, 23 . . . speed zone computation unit, 24 . . . target speed computation unit, 25 . . . target lateral position computation unit, 26 . . . traffic information acquisition unit, 27 . . . object information acquisition unit, 29 . . . viewing direction detection unit, 31 . . . driving assistance control unit, 32 . . . target speed profile creation unit, SM . . . host vehicle, RM, LM . . . other vehicle (mobile object), DP . . . driver

The invention claimed is:

1. A driving assistance device comprising:
a blind spot recognition unit configured to recognize a blind spot of a driver in a progressing direction of a host vehicle;
a mobile object information setting unit configured to set mobile object information including at least an assumed speed of a mobile object, as information on the mobile object having a possibility of appearing suddenly from the blind spot;
a speed zone computation unit configured to compute a speed zone of the host vehicle having a possibility that the host vehicle will come into contact with the mobile object when progressing in the progressing direction, based on the mobile object information set by the mobile object information setting unit;
a target speed computation unit configured to compute a target speed of the host vehicle based on a speed zone; and
a target speed profile creation unit configured to create a target speed profile for decelerating the host vehicle from the current speed to the blind spot entry target speed, based on a blind spot entry target speed which is the target speed of the host vehicle at the time of entering a place forming the blind spot, a current speed of the host vehicle, and a target acceleration for deceleration,
wherein the target speed profile creation unit is configured to create the target speed profile, based on the target acceleration which is constant, a first target position in which a speed of the host vehicle is set as the blind spot entry target speed in front of the blind spot, and a second target position in which deceleration according to the target acceleration is started,
wherein the target speed profile creation unit is configured to create the target speed profile using at least one computation method, among a first computation method which computes the first target position and the second target position after the target acceleration is set, a second computation method which computes the target acceleration and the second target position after the first target position is set, and a third computation method which computes the target acceleration and the first target position after the second target position is set, and
wherein the target speed profile creation unit is configured to study characteristics of the driver, and to determine one computation method, among the first computation method, the second computation method, and the third computation method, based on the characteristics of the driver.

2. The driving assistance device according to claim 1, wherein the target speed profile creation unit is configured to create the target speed profile by computing a contact point of a boundary line of the speed zone and the target speed profile.

* * * * *